(12) United States Patent
Ayush et al.

(10) Patent No.: US 10,956,967 B2
(45) Date of Patent: Mar. 23, 2021

(54) GENERATING AND PROVIDING AUGMENTED REALITY REPRESENTATIONS OF RECOMMENDED PRODUCTS BASED ON STYLE SIMILARITY IN RELATION TO REAL-WORLD SURROUNDINGS

(71) Applicant: Adobe Inc., San Jose, CA (US)

(72) Inventors: Kumar Ayush, Jamshedpur (IN); Gaurush Hiranandani, Jaipur (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/004,787

(22) Filed: Jun. 11, 2018

(65) Prior Publication Data

US 2019/0378204 A1    Dec. 12, 2019

(51) Int. Cl.
*G06Q 30/06*     (2012.01)
*G06T 19/00*     (2011.01)

(52) U.S. Cl.
CPC ..... *G06Q 30/0643* (2013.01); *G06Q 30/0631* (2013.01); *G06T 19/006* (2013.01)

(58) Field of Classification Search
CPC ............ G06Q 30/0643; G06Q 30/0631; G06T 19/006
USPC ......................................................... 345/633
See application file for complete search history.

(56) References Cited

U.S. PATENT DOCUMENTS

| 8,606,645 | B1  |         | 12/2013 | Applefeld |             |
|-----------|-----|---------|---------|-----------|-------------|
| 9,449,342 | B2  | *       | 9/2016  | Sacco     | G06T 19/006 |
| 10,529,137| B1  | *       | 1/2020  | Black     | G06N 20/00  |
| 2002/0045959 | A1 |       | 4/2002  | Van Overveld |          |
| 2012/0323910 | A1 |       | 12/2012 | Ilyas et al. |          |
| 2013/0106910 | A1 |       | 5/2013  | Sacco     |             |
| 2014/0285522 | A1 | *     | 9/2014  | Kim       | G06T 19/006 |
|           |     |         |         |           | 345/633     |
| 2014/0337174 | A1 |       | 11/2014 | Lin et al. |           |

(Continued)

OTHER PUBLICATIONS

Inside Houzz: Introducing View in My Room' retrieved Jan. 24, 2018 from https://www.houzz.ie/magazine/inside-houzz-introducing-view-in-my-room-stsetivw-vs-103238920 (Year: 2018).*

(Continued)

*Primary Examiner* — Hai Tao Sun
(74) *Attorney, Agent, or Firm* — Keller Jolley Preece

(57) ABSTRACT

The present disclosure relates to systems, methods, and non-transitory computer readable media for generating augmented reality representations of recommended products based on style similarity with real-world surroundings. For example, the disclosed systems can identify a real-world object within a camera feed and can utilize a 2D-3D alignment algorithm to identify a three-dimensional model that matches the real-world object. In addition, the disclosed systems can utilize a style similarity algorithm to generate style similarity scores for products in relation to the identified three-dimensional model. The disclosed systems can also utilize a color compatibility algorithm to generate color compatibility scores for products, and the systems can determine overall scores for products based on a combination of style similarity scores and color compatibility scores. The disclosed systems can further generate AR representations of recommended products based on the overall scores.

20 Claims, 14 Drawing Sheets

(56) References Cited

U.S. PATENT DOCUMENTS

| | | | |
|---|---|---|---|
| 2015/0178786 A1 | 6/2015 | Claessens | |
| 2016/0019618 A1 | 1/2016 | Lin et al. | |
| 2018/0012411 A1* | 1/2018 | Richey | G06T 7/73 |
| 2018/0260843 A1 | 9/2018 | Hiranandani et al. | |

OTHER PUBLICATIONS

Peter O'Donovan, Color Compatibility From Large Datasets, ACM Transactions on Graphics, vol. 30, No. 4, Article 63, Publication date: Jul. 2011 (Year: 2011).*

Lun, Elements of Style: Learning Perceptual Shape Style Similarity, ACM Transactions on Graphics, vol. 34, No. 4, Article 84, Publication Date: Aug. 2015 (Year: 2015).*

Liu, Style Compatibility for 3D Furniture Models, ACM Transactions on Graphics, vol. 34, No. 4, Article 85, Publication Date: Aug. 2015 (Year: 2015).*

Q Mei, J Guo, D Radev. DivRank: the interplay of prestige and diversity in information networks. Proceedings of the 16th ACM SIGKDD international conference on Knowledge discovery and data mining, 2010.

Gupta, Saurabh, et al. "Learning rich features from RGB-D images for object detection and segmentation." European Conference on Computer Vision. Springer International Publishing, 2014.

Ye, Jun, and Kien A. Hua. "Exploiting depth camera for 3d spatial relationship interpretation." Proceedings of the 4th ACM Multimedia Systems Conference. ACM, 2013.

Rishiraj Saha Roy et al. Automated Linguistic Personalization of Targeted Marketing Messages Mining UserGenerated Text on Social Media, Apr. 2015.

Lavneet Singh, Girija Chetty. Email Personalization and User Profiling Using RANSAC Multi Model Response Regression Based Optimized Pruning Extreme Learning Machines and Gradient Boosting Trees. International Conference on Neural Information Processing Systems, 2015.

Navdeep S. Sahni, S. Christian Wheeler and Pradeep Chintagunta. Personalization in Email Marketing: The Role of Self-Relevant Non-Informative Advertising Content, Jan. 30, 2016.

Modani, Natwar et al. "Creating Diverse Product Review Summaries: A Graph Approach" International Conference on Web Information Systems Engineering, Dec. 25, 2015.

Maureen Stone, Choosing Colors for Data Visualization, Jan. 17, 2006.

Tianyi Wu, Yuguo Chen and Jiawei Han. Association Mining in Large Databases: A Re-examination of Its Measures. 11th European Conference on Principles and Practice of Knowledge Discovery in Databases (2007).

Carly Stec, 6 Tips for Making the Most of Your Retargeting Campaigns, http://blog.hubspot.com/agency/retargeting-campaigns#sm.0000p5uh3wlw6eihxsd1a5wgivk90, May 18, 2015.

TextilWirtschaft, Goertz Virtual Shoe Fitting, https://www.youtube.com/watch?v=silya3JSpEU, Jun. 1, 2012.

Julie Hopkins, Adam Sarner "Market Guide for Email Marketing", Nov. 30, 2015.

"Augmented/Virtual Reality revenue forecast revised to hit $120 billion by 2020," http://www.digi-capital.com/news/2016/01/augmentedvirtual-reality-revenue-forecast-revised-to-hit-120-billion-by-2020/ dated Jan. 13, 2016.

Papagiannis, H., "Announcing: Augmented Human: How Technology is Shaping the New Reality," https://augmentedstories.com/page/2/ dated May 31, 2015.

"Augmented and Virtual Reality Devices to Become a $4 Billion-Plus Business in Three Years," http://www.ccsinsight.com/press/company-news/2251-augmented-and-virtual-reality-devices-to-become-a-4-billion-plus-business-in-three-years, retrieved Jul. 26, 2018.

"Increasing Conversions with Retargeting Emails and Website Personalization," http://www.barilliance.com/wp-content/uploads/2015/09/Increasing-conversions-with-cart-abandonment-and-website-personalization, retrieved Jul. 26, 2018.

"All the needles you want in a really, really big haystack," https://www.advertising.com/advertiser/targeting dated Jul. 26, 2018.

Weng, Sung-Shun, and Mei-Ju Liu. "Personalized product recommendation in e-commerce." e-Technology, e-Commerce and e-Service, 2004. EEE'04. 2004 IEEE International Conference on. IEEE, 2004.

Grbovic, Mihajlo, et al. "E-commerce in Your Inbox: Product Recommendations at Scale." Proceedings of the 21th ACM SIGKDD International Conference on Knowledge Discovery and Data Mining. ACM, 2015.

http://vuforia.com/ retrieved Jul. 26, 2018.

https://unity3d.com/ retrieved Jul. 26, 2018.

Shaoqing Ren, Kaiming He, Ross Girshick, Jian Sun. Faster R-CNN: Towards Real-Time Object Detection with Region Proposal Networks. Advances in Neural Information Processing Sytems (NIPS), 2015.

Girshick, Ross, et al. "Rich feature hierarchies for accurate object detection and semantic segmentation," airXiv:1311.2524v5 [cs.CV], dated Oct. 22, 2014.

M. Aubry, D. Maturana, A. Efros, B. Russell and J. Sivic. "Seeing 3D chairs: exemplar part-based 2D-3D alignment using a large dataset of CAD models". CVPR, 2014.

Tiangiang Liu, Aaron Hertzmann, Wilmot Li and Thomas Funkhouser. "Style Compatibility for 3D Furniture Models". ACM Transactions on Graphics, Aug. 2015.

Kulis, B. "Metric learning: A survey". Foundations & Trends in Machine Learning. 2012.

Naresh Boddeti, Vishnu, Takeo Kanade, and B. V. K. Vijaya Kumar. "Correlation filters for object alignment." Proceedings of the IEEE Conference on Computer Vision and Pattern Recognition. 2013.

Peter O'Donovan, Aseem Agarwala, Aaron Hertzmann. Color Compatibility From Large Datasets. ACM Transactions on Graphics, 2011, 30, 43, (Proc. SIGGRAPH).

Jones, Donald R., Cary D. Perttunen, and Bruce E. Stuckman. "Lipschitzian optimization without the Lipschitz constant." Journal of Optimization Theory and Applications 79.1 (1993): 157-181.

Heather Pemberton Levy "5 Key Trends in Gartner's 2015 Digital Marketing Hype Cycle" http://www.gartner.com/smarterwithgartner/five-key-trends-in-gartners-2015-digital-marketinghype-cycle/ dated Oct. 1, 2015.

Joachims, T. Optimizing Search Engines using Clickthrough Data. Proceedings of the ACM Conference on Knowledge Discovery and Data Mining, 2003.

https://pypi.python.org/pypi/Pillow/2.1.0 dated Jul. 2, 2013.

http://www.ray-ban.com/india/virtual-mirror, Ray-Ban® Official Site India retrieved Jul. 26, 2018.

Zhaoliang Lun, Evangelos Kalogerakis, Alla Sheffer. Elements of Style: Learning Perceptual Shape Style Similarity. ACM Transactions on Graphics (Proc. ACM SIGGRAPH 2015).

U.S. Appl. No. 15/972,815, filed Feb. 13, 2020, Office Action.

U.S. Appl. No. 15/454,750, filed Dec. 23, 2019, Office Action.

Zhang et al., E-Commerce Direct Marketing using Augmented Reality, 2000, IEEE (Year: 2000).

Yim et al., Is Augmented Reality Technology and Effective Tool for E-commerce, Jun. 27, 2017, Journal of Interactive Marketing Year: 2017).

Kalkofen et al., "Interactive Focus and Context Visualization for Augmented Reality," 2007 6th IEEE and ACM International Symposium on Mixed and Augmented Reality, Nara, 2007, pp. 191-201, doi: 10.1109/ISMAR.2007.4538846. (Year: 2007).

U.S. Appl. No. 15/972,815, filed May 19, 2020, Notice of Allowance.

U.S. Appl. No. 15/454,750, filed Jul. 1, 2020, Office Action.

U.S. Appl. No. 15/454,750, filed Aug. 28, 2020, Notice of Allowance.

* cited by examiner

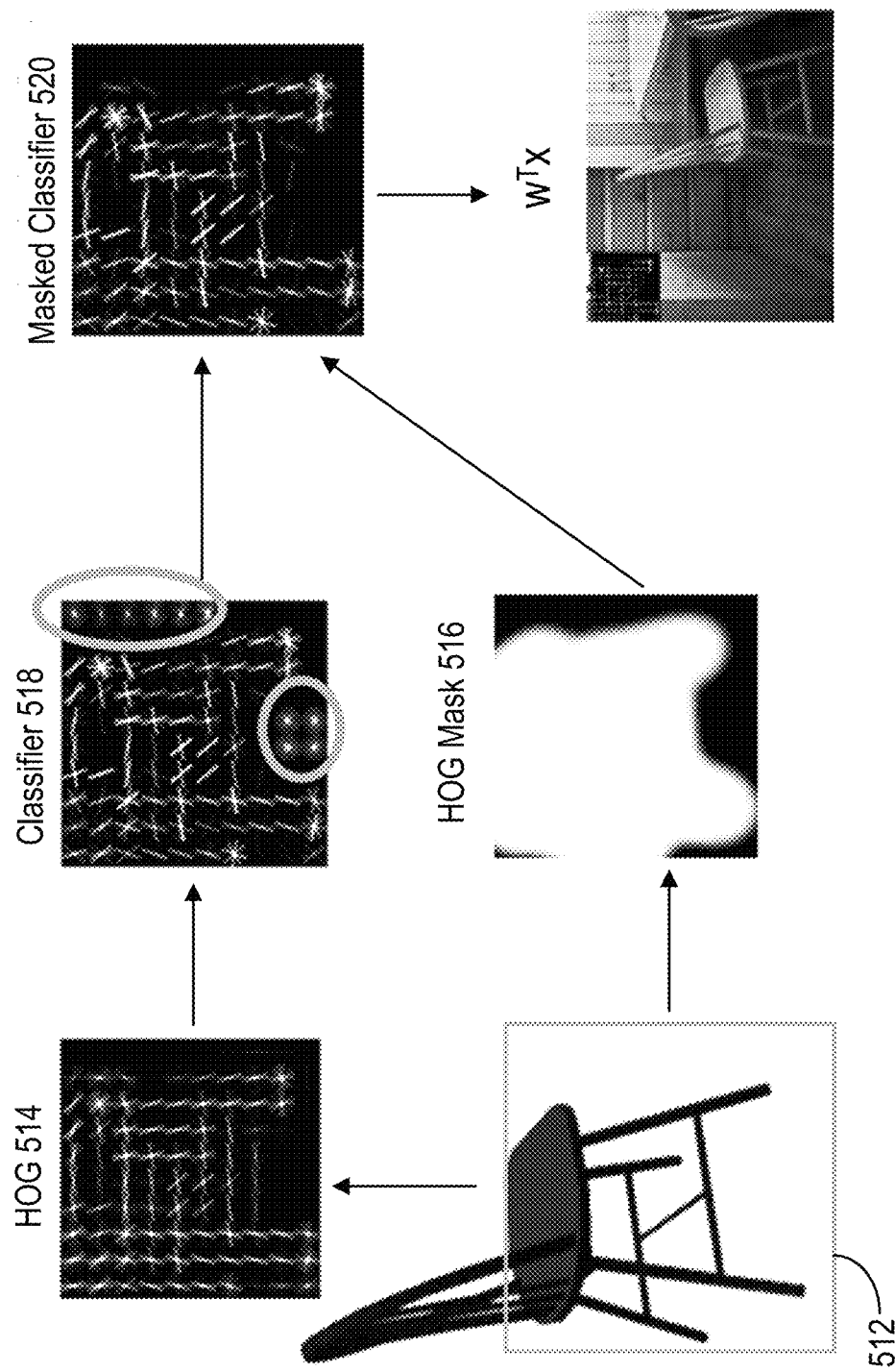

| Cost | Kernel | $w_1$ | $w_2$ | Accuracy |
|---|---|---|---|---|
| 1 | linear | 0.14 | 1.52 | 60.23 |
| 1.5 | linear | 0.17 | 1.64 | 62.67 |
| 2 | linear | 0.17 | 1.67 | 65.67 |
| 2.5 | linear | 0.18 | 1.57 | 68.84 |
| 3 | linear | 0.20 | 1.65 | 71.34 |
| 3.5 | linear | 0.21 | 1.65 | 73.19 |
| 4 | linear | 0.21 | 1.65 | 73.19 |
| 4.5 | linear | 0.21 | 1.65 | 73.19 |
| 5 | linear | 0.21 | 1.65 | 73.19 |

Fig. 8

GENERATING AND PROVIDING AUGMENTED REALITY REPRESENTATIONS OF RECOMMENDED PRODUCTS BASED ON STYLE SIMILARITY IN RELATION TO REAL-WORLD SURROUNDINGS

BACKGROUND

Digital content providers, digital publishers, and digital marketers increasingly seek techniques for creating targeted content that personalizes communications for users based on available information about the users. Such targeted content comes in various forms. For example, some digital publishers and marketers create targeted content by inserting a user's name (extracted from a user profile) into an email, pop-up advertisement, or another digital message. Other digital marketers create targeted content by, for example, adjusting content of a message based on a device's location data, such as information extracted from a web browser or an IP address connected to the user's device. Still other digital marketers contextualize content by identifying adjectives or adverbs from social media posts and inserting the identified adjectives or adverbs into advertisements.

In addition to extracting information from a device or from software running on the device, digital publishers and marketers commonly create targeted content based on a user's web-browsing data. For example, some conventional techniques of contextualized content delivery include selecting content based on a user's web-browsing history (e.g., URL addresses visited by a user) or prior e-commerce transactions (e.g., products purchased through a website or mobile application). Other conventional techniques of contextualized content delivery include generating a product recommendation based on metadata associated with the product.

While conventional techniques can enable marketers to provide relevant information, conventional techniques often have various drawbacks. For example, users are often wary of providing information on the Internet and often intentionally provide false information. As such, targeted content based on web-browsing data can be inaccurate. Furthermore, techniques that rely upon metadata commonly rely on administrators or others to properly tag or otherwise associate products with metadata, which can be time consuming, expensive, and inaccurate. Because of their reliance on human generated metadata, these conventional techniques can generate inaccurate, ineffective product recommendations that users frequently ignore. Furthermore, such techniques are inflexible and cannot adapt to scenarios where metadata is unavailable. In addition, conventional techniques often fail to target aspects of user's lives, like their physical surroundings, not apparent from their digital footprint.

SUMMARY

One or more embodiments described herein provide benefits and solve one or more of the foregoing or other problems in the art by providing systems, methods, and non-transitory computer readable media that accurately and flexibly generate augmented reality ("AR") product recommendations. The disclosed systems identify objects within an augmented reality scene to gather information concerning the user's physical environment or physical features. In particular, the disclosed systems and methods detect characteristics of objects shown within an AR scene and, based on the detected characteristics, generate targeted content for a user. For instance, the disclosed systems utilize a style similarity algorithm to identify products whose style matches the style of an object in a user's real-world surroundings detected from the AR scene.

For example, to generate an AR product recommendation, the disclosed systems identify a real-world object depicted within a camera view of a user client device. The disclosed systems also determine an object class of the real-world object. Based on the identified real-world object, the systems determine a three-dimensional model from a model database that matches the identified real-world object. Accordingly, based on the three-dimensional model that matches the identified real-world object, and further based on the object class of the real-world object, the disclosed systems utilize a style similarity algorithm to generate a recommended product that is similar in style to the real-world object. In addition, the systems remove a real-world object from a view associated with the camera feed. The systems further replace the real-world object with an AR representation of the recommended product as an overlay within the real-world environment. The systems also utilize a color compatibility algorithm in relation to the stylistically similar recommended product to generate an AR representation of the recommended product that is color compatible with the real-world environment.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 5A-5B illustrate an overview of a process of identifying a three-dimensional model using a 2D-3D alignment algorithm in accordance with one or more implementations;

FIG. 8 illustrates a table of learned weights for combining style similarity and color compatibility in accordance with one or more implementations;

DETAILED DESCRIPTION

Figure 1:
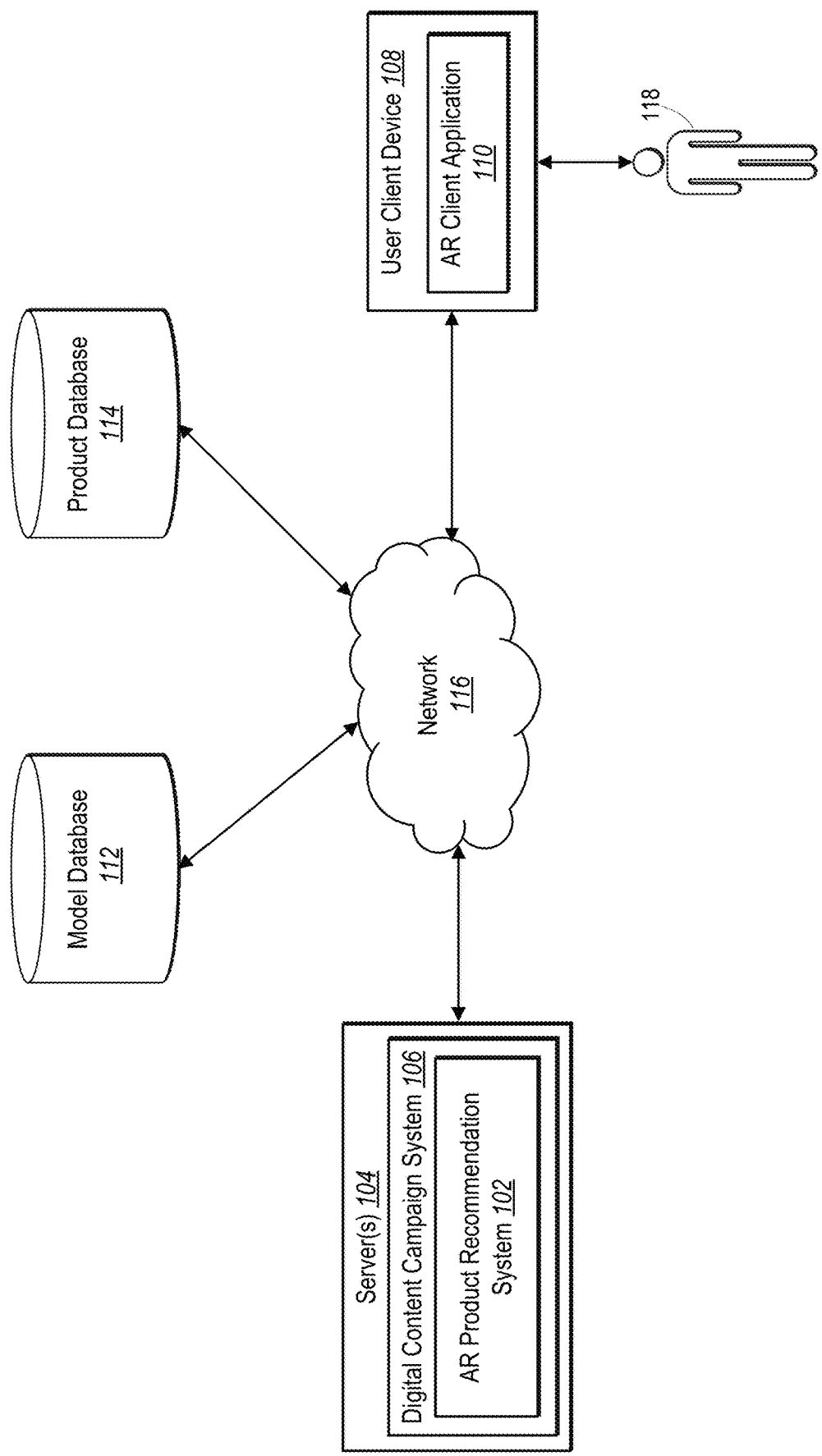
FIG. 1 illustrates an example environment for implementing an augmented reality ("AR") product recommendation system in accordance with one or more implementations.

This disclosure describes one or more embodiments of an augmented reality ("AR") product recommendation system that accurately and flexibly generates AR product recommendations that match the style of surrounding real-world objects. In particular, the disclosed AR product recommendation system detects objects shown within an AR scene (received from a user's client device) and, based on the detected objects, selects products with matching styles to recommend to the user. For example, to generate an AR product recommendation, the AR product recommendation system identifies a real-world object within a camera view of a user client device to replace with an AR product recommendation. The AR product recommendation system further determines an object class associated with the identified real-world object. Based on the identified real-world object, the AR product recommendation system determines a three-dimensional model from a model database that matches the identified real-world object. The AR product recommendation system then utilizes a style similarity algorithm to generate a recommended product that is similar in style to the object being replaced from the camera view. In addition, the AR product recommendation system removes the identified real-world object from an image captured from the camera feed. The AR product recommendation system further replaces the real-world object with an AR representation of the recommended product as an overlay within the real-world environment captured by the image. The AR product recommendation system also utilizes a color compatibility algorithm in relation to the AR representation of the stylistically similar recommended product to generate a color compatible AR representation of the recommended product.

As overview, the AR product recommendation system works in connection with an AR client application. The AR client application enables a user to insert virtual objects into a real-world scene of the user's choosing to create an AR scene. Thus, the AR client application allows a user to see how a product would appear in a real-world environment without necessarily possessing the actual product. Typically, a user is left to their own devices to select a virtual product to insert into the real-world scene. One will appreciate that, when there are many different potential virtual objects, this process can be tedious and time consuming. As explained below, the AR product recommendation system uses computer vision techniques and artificial intelligence to generate recommended products that match a style of one or more real-world objects in the real-world scene.

To generate an AR representation of a product to recommend to a user, the AR product recommendation system can analyze a camera feed of a user client device to determine a viewpoint associated with the camera feed. In particular, the AR product recommendation system can capture a frame of the camera feed while a user is operating an AR client application (e.g., a product recommendation application). Accordingly, the AR product recommendation system can capture a frame at a time instant when the user client device satisfies a stillness threshold to generate a viewpoint that depicts a real-world environment associated with the user client device.

In addition, the AR product recommendation system can analyze the viewpoint generated from the camera feed to identify one or more real-world objects. For instance, the AR product recommendation system can utilize a region-based convolutional neural network ("R-CNN") to generate proposed regions of the viewpoint with corresponding probabilities of containing objects. Indeed, the AR product recommendation system can utilize an R-CNN to generate bounding boxes around regions of the viewpoint. The AR product recommendation system can further generate a confidence score (e.g., a probability) as well as an object label for each bounding box that indicates a likelihood of the bounding box containing a real-world object that corresponds to the given object label.

In addition to identifying real-world objects within the viewpoint, the AR product recommendation system can further analyze the real-world objects to determine a location and an orientation associated with each identified real-world object. For instance, the AR product recommendation system can determine an orientation or pose of a real-world object by determining an angle in which the object is facing. For example, as described in further detail below, the AR product recommendation system can determine the orientation using a 2D-3D alignment algorithm.

The AR product recommendation system can further identify a three-dimensional model that matches a real-world object from an AR scene. The AR product recommendation system can use the three-dimensional model as a basis for determining products that match a style of an identified real-world object. To elaborate, the AR product recommendation system can implement a 2D-3D alignment algorithm to identify, from a model database, a three-dimensional model that matches (e.g., is within a similarity threshold of) the identified real-world object. Additional detail regarding utilizing the 2D-3D alignment algorithm to identify a three-dimensional model that matches a real-world object depicted within a viewpoint is provided below with reference to the figures.

The AR product recommendation system can further generate one or more recommended products based on style similarity with the real-world environment shown in the viewpoint (e.g., as captured via the camera feed). To illustrate, the AR product recommendation system can utilize a style similarity algorithm to determine similarity scores for products from within a product database that share similar geometric features with the three-dimensional model. In addition, the AR product recommendation system can identify products that match an object class associated with the identified real-world object. Indeed, the AR product recommendation system generates product recommendations by identifying products with similar stylistic appearance to the identified three-dimensional model (i.e., the three-dimensional model that matches the real-world object identified within the viewpoint) and with an object class that matches (or is similar to) the object class of the real-world object that is to be replaced with an AR product recommendation. Additional detail regarding generating product recommendations by utilizing a style similarity algorithm is provided below with reference to the figures.

Upon generating recommended products, the AR product recommendation system can further generate AR representations of the recommended products to provide for display to the user. In particular, based on replacing the identified real-world object with a stylistically similar recommended product, the AR product recommendation system can utilize a color compatibility algorithm to generate a color compatibility score as a basis for generating an AR representation of a recommended product that matches a color theme present in the viewpoint. Thus, based on the color compatibility score as well as the determined similarity score, the AR product recommendation system can embed the color-compatible AR representation of the recommended product within the real-world environment of the camera feed. For example, the AR product recommendation system can remove an identified real-world object from the depicted real-world environment and replace the real-world object with a stylistically similar AR representation of a recommended product (e.g., stylistically similar to the real-world object) that is also color compatible with the real-world environment. Thus, in the view of the user, the AR representation matches not only the style of the real-world environment but also the colors of the real-world environment.

Accordingly, the AR product recommendation system can provide one or more AR representations of recommended products as an overlay within the real-world environment of the camera feed. In some embodiments, the AR product recommendation system provides AR representations of more than one recommended product so that the user can compare the recommended products. Additional detail regarding generating the AR representations is provided below with reference to the figures.

Additionally, the AR product recommendation system can further determine overall scores for the recommended products. To elaborate, the AR product recommendation system can weight a style similarity score and can further weight a color compatibility score. To determine the weights, the AR product recommendation system can utilize a rank support vector machine ("SVM") algorithm that employs a pair-wise ranking method. Based on the scores and their respective weights, the AR product recommendation system can determine an overall score for each recommended product. In addition, the AR product recommendation system can select a number of products that correspond to top overall scores to provide AR product recommendations to a user client device (e.g., via emails, push notifications, AR environments, etc.).

The AR product recommendation system provides several advantages over conventional product recommendation systems. For example, the AR product recommendation system improves the accuracy and effectiveness of product recommendations over conventional systems. For instance, rather than merely relying on user-entered metadata to generate product recommendations, the AR product recommendation system utilizes a style similarity algorithm to identify products that are similar in style to real-world surroundings associated with a user client device. Thus, the AR product recommendation system more accurately generates recommended products that match a particular scene captured by a camera feed.

For similar reasons, the AR product recommendation system provides product recommendations that more accurately reflect a user's taste or preference, which results in a greater likelihood of conversions (e.g., as part of a digital content campaign). Furthermore, the AR product recommendation system generates more effective product recommendations because not only do the recommended products more closely match a style of a real-world environment, but users can also gain a better sense what a particular product would look like within the real-world environment by viewing the AR representation of the product. The AR product recommendation system thus more thoroughly informs users about products, enabling users to make smarter purchasing decisions.

The AR product recommendation system also improves flexibility over conventional systems. To illustrate, conventional product recommendation systems analyze metadata to identify similar products by, for example, identifying products that have matching tags. These systems thus rely on accurate metadata to match products and may ignore products that have similar visual appearances, but which are poorly or improperly tagged. The AR product recommendation system, by contrast, analyzes objects identified within a camera feed based on their visual appearance and further identifies products that match an identified style. Thus, the AR product recommendation system can flexibly adapt to any real-world environment associated with a user client device to generate recommended products based on the visual context of the user client device as captured by the camera feed.

As illustrated by the foregoing discussion, the present disclosure utilizes a variety of terms to describe features and benefits of the AR product recommendation system. Additional detail is hereafter provided regarding the meaning of these terms as used in this disclosure. For example, as used herein, the term "product" refers to an object or item that the AR product recommendation system can recommend for purchase. In particular, a product can refer to a particular type of product. In other words, products can belong to classes. Indeed, the AR product recommendation system can classify objects and/or products into object classes. As used herein, the term "object class" refers to a type or group of products that share attributes or characteristics. Example object classes include, but are not limited to, chairs, tables, couches, shirts, pants, shoes, hats, etc. In addition, an object class can be indicated by an "object label" associated with a particular object and that designates the respective object class.

As mentioned, the AR product recommendation system analyzes a camera feed received from a user client device to determine a viewpoint that depicts a real-world environment associated with the user client device. As used herein, the term "user client device" refers to a computing device associated with a user. For example, a user client device can refer to a mobile device such as a smartphone or tablet or can refer to a non-mobile device such as a desktop or laptop computer. A user client device can also refer to an AR device capable of rendering AR content on a view of a real-world environment. For example, a user client device can refer to MICROSOFT HOLOLENS or MAGIC LEAP LIGHTWEAR.

As also used herein, the term "camera feed" refers to a view or scene captured by a camera associated with a user client device. In particular, a camera feed can refer to a view of a real-world environment captured by the camera of the user client device and that is viewable by a user via a display associated with the user client device. For example, a camera feed can refer to a view of a room, a field, a person, a group of people, or some other scene captured by a camera.

As mentioned, the AR product recommendation system determines a viewpoint from the camera feed. As used herein, the term "viewpoint" refers to a view of a camera at a particular time instant. In particular, a viewpoint can refer to a frame captured from the camera feed at a given time instant based on detecting user operation of an AR client application of the user client device.

As used herein, the term "augmented reality product" or "AR product" refers to an AR representation of a product. Indeed, as mentioned, the AR product recommendation system can generate an AR product to overlay on a view of a real-world environment to appear as though the AR product is within the real-world environment. For example, the AR product recommendation system can generate the AR product to be world-fixed (i.e., fixed in world-space) in relation to the real-world environment so that, as a user moves a user client device, the AR product appears to stay in place within the real-world environment. In addition, the AR product recommendation system can enable a user to interact with an AR product to move, rotate, and/or scale the AR product within the real-world environment of the camera feed.

As mentioned, the AR product recommendation system analyzes the viewpoint to identify a real-world object. As used herein, the term "real-world object" (or sometimes simply "object") refers to an object that is depicted within the camera feed. In particular, a real-world object can refer to a physical object that exists in the physical world. For example, a real-world object may include, but is not limited to, accessories, animals, clothing, cosmetics, footwear, fixtures, furnishings, furniture, hair, people, physical human features, vehicles, or any other physical object that exists outside of a computer. In some embodiments, a digital image depicts real objects within an AR scene. The AR product recommendation system can identify and analyze a real-world object to identify a style of the real-world object to which the AR product recommendation system can match recommended products.

Indeed, based on an identified real-world object, the AR product recommendation system can access a model database to identify a three-dimensional model that matches the identified object. As used herein, the term "three-dimensional model" refers to a model stored in a digital repository (e.g., a model database) that the AR product recommendation system can match to a real-world object identified within the viewpoint. The AR product recommendation system can also utilize a three-dimensional model as a basis for identifying products that are similar in style, theme, or appearance. As will be described in further detail below, to match a three-dimensional model with a real-world object, the AR product recommendation system can utilize a 2D-3D alignment algorithm.

As mentioned, the AR product recommendation system further generates recommended products by implementing a style similarity algorithm. As used herein, the term "style similarity algorithm" refers to a method or process which the AR product recommendation system utilizes to rank a plurality of products stored within a product database based on relevance to a user. For example, a style similarity algorithm can refer to one or more machine learning models that the AR product recommendation system trains and/or utilizes to generate similarity scores for products in relation to a particular three-dimensional model based on comparing geometric features.

In addition to generating a product recommendation based on style similarity, the AR product recommendation system can further generate an AR representation of a recommended product based on color. In particular, the AR product recommendation system can utilize a "color compatibility algorithm" to determine a color theme associated with the viewpoint and to further modify an AR representation of a recommended product to match the color theme. Indeed, the AR product recommendation system can adjust the color of an AR representation to more accurately match the setting of the real-world environment. For instance, upon replacing an identified real-world object with a candidate product that is stylistically similar (by identifying a matching 3D model), the AR product recommendation system can utilize a color compatibility algorithm to generate a color compatibility score for the candidate product. Thus, the AR product recommendation system can generate AR representations of recommended products that match a style and color of a real-world environment.

As mentioned, in some embodiments the AR product recommendation system trains one or more machine learning models (e.g., neural networks) based on training data. As used herein, the term "train" refers to utilizing information to tune or teach a machine learning model. The term "training" (used as an adjective or descriptor, such as "training object") refers to information or data utilized to tune or teach the machine learning model.

More detail regarding the AR product recommendation system will now be provided with reference to the figures. For example, FIG. 1 illustrates a schematic diagram of an example environment for implementing an AR product recommendation system 102 in accordance with one or more embodiments. An overview of the AR product recommendation system 102 is described in relation to FIG. 1. Thereafter, a more detailed description of the components and processes of the AR product recommendation system 102 is provided in relation to the subsequent figures.

As shown in FIG. 1, the environment includes server(s) 104, a user client device 108, a model database 112, a product database 114, and a network 116. Each of the components of the environment can communicate via the network 116. The network 116 may be any suitable network over which computing devices can communicate. Example networks are discussed in more detail below in relation to FIG. 13.

As shown in FIG. 1, the environment includes a user client device 108 associated with a user 118. The user client device 108 can be one of a variety of computing devices, including a smartphone, desktop computer, laptop computer, AR device, or other computing device as described in relation to FIG. 13. Although FIG. 1 illustrates a single user client device 108, in some embodiments the environment can include multiple different user client devices, each associated with a different user.

As illustrated in FIG. 1, the environment includes the server(s) 104. The server(s) 104 may generate, store, receive, and transmit electronic data, such as AR content, digital video, digital images, metadata, etc. For example, the server(s) 104 may receive data from the user client device 108 in the form of a camera feed. In addition, the server(s) 104 can transmit data to the user client device 108 to provide an AR representation of a recommended product within a user's view of the camera feed. For example, the server(s) 104 can communicate with the user client device 108 to transmit and/or receive data via the network 116. In some embodiments, the server(s) 104 comprises a content server. The server(s) 104 can also comprise an application server, a communication server, a web-hosting server, a social networking server, or a digital content campaign server.

As shown in FIG. 1, the server(s) 104 also include the AR product recommendation system 102 which can form part of a digital content campaign system 106. The digital content campaign system 106 can communicate with the user client device 108 to provide digital content such as product information (e.g., recommendations) that corresponds to a style identified within a camera feed captured by the user client device 108 or some other type of information.

Although FIG. 1 depicts the AR product recommendation system 102 located on the server(s) 104, in some embodiments, the AR product recommendation system 102 may be implemented by (e.g., located entirely or in part) on one or more other components of the environment. For example, the AR product recommendation system 102 may be implemented by the user client device 108.

Moreover, in one or more embodiments, the AR product recommendation system 102 is implemented on a third-party server. For example, in such embodiments, the server(s) 104 may be associated with a digital content publisher, and a third-party server can host the AR product recommendation system 102. Specifically, the third-party server can receive information regarding a user, provide identification information for the user from the third-party server to the digital content publisher by way of the server(s) 104, and the server(s) 104 can select and provide digital content for display to a client device (e.g., the user client device 108) of a user (e.g., the user 118).

As mentioned, the AR product recommendation system 102 may provide AR representations of recommended products to the user client device 108. Indeed, the AR product recommendation system 102 can distribute (e.g., via the network 116) product recommendations to the user client device 108, including AR content in the form of AR representations of the recommended products.

As illustrated in FIG. 1, the user client device 108 includes an AR client application 110. The AR client application 110 may be a web application or a native application installed on the user client device 108 (e.g., a mobile application, a desktop application, etc.). The AR client application 110 can interface with the AR product recommendation system 102 to provide camera feed content and/or AR content to the server(s) 104, and to present (e.g., display) AR content received from the server(s) 104. Indeed, the AR client application 110 can receive data from the AR product recommendation system 102 and can present, for display, a user interface as part of a webpage, a social networking feed, or an application interface that includes an AR representation of a recommended product.

As further illustrated in FIG. 1, the environment includes a model database 112 and a product database 114. In particular, the AR product recommendation system 102 and/or the user client device 108 can communicate with the model database 112 and/or the product database 114 via the network 116. For example, the AR product recommendation system 102 can access the model database 112 to identify a three-dimensional model that matches a real-world object identified within a camera feed of the user client device 108. In addition, the AR product recommendation system 102 can access the product database 114 to identify products that are similar in style with a particular three-dimensional model. Although FIG. 1 illustrates the model database 112 as distinct from the product database 114, in some embodiments the model database 112 and the product database 114 can be a single database or else can be housed within a single location.

In some embodiments, though not illustrated in FIG. 1, the environment may have a different arrangement of components and/or may have a different number or set of components altogether. For example, the user client device 108 may communicate directly with the AR product recommendation system 102, bypassing the network 116. Additionally, the product database 114 may be housed within the user client device 108 and/or the server(s) 104, along with the model database 112. Further, the AR product recommendation system 102 can include one or more machine learning models (e.g., neural networks), and the AR product recommendation system 102 be implemented in a variety of different ways across the server(s) 104, the network 116, and the user client device 108.

Figure 2:
FIG. 2 illustrates an AR object within a viewpoint of an AR scene in accordance with one or more implementations.

As mentioned, the AR product recommendation system 102 generates an AR representation of a recommended product based on analyzing a camera feed of a user client device (e.g., the user client device 108). Indeed, FIG. 2 illustrates an AR environment 200 that includes real-world objects and that further includes an AR object 202. Indeed, the AR product recommendation system 102 can monitor activity of a user 118 within the AR client application 110 to detect when an AR object 202 is placed within the AR environment 200.

For example, the AR product recommendation system 102 can detect user input to select the AR object 202 to overlay the AR object 202 within the AR environment 200. In the same or other embodiments, the AR product recommendation system 102 detects user input to manipulate the AR object 202—to change its location and/or orientation. In other embodiments, the AR product recommendation system 102 selects a default AR object 202 to overlay within the AR environment 200 of the AR client application 110 (e.g., upon initializing the AR client application 110).

As illustrated in FIG. 2, the AR product recommendation system 102 generates the AR environment 200 to provide to the user client device 108 for display to the user 118. To generate the AR environment 200, the AR product recommendation system 102 receives a camera feed from the user client device 108. In particular, the AR product recommendation system 102 receives a camera feed that depicts a scene of a real-world environment that includes real-world objects such as couches, chairs, tables, pictures, etc.

Although FIG. 2 and subsequent figures illustrate a room with furniture where the AR product recommendation system 102 generates an AR chair to recommend to a user, in some embodiments the AR product recommendation system 102 generates recommended products apart from furniture. Indeed, the AR product recommendation system 102 can analyze a camera feed that depicts any real-world environment such as an outdoor scene, a person wearing a particular style of clothing, or some other scene. Accordingly, the AR product recommendation system 102 can generate recommended products (and AR representations of those products) based on the real-world environment of the camera feed—e.g., to recommend products such as clothing items that are similar to the style of clothing worn by a group of people, accessories that match an outfit worn by an individual, landscaping items that match outdoor scenery of a house, etc.

Figure 3:
FIG. 3 illustrates a viewpoint of an AR scene in accordance with one or more implementations.

As mentioned, the AR product recommendation system 102 determines a viewpoint based on receiving a camera feed and/or detecting the AR object 202. Indeed, FIG. 3 illustrates a selected viewpoint 300. As shown, the viewpoint 300 includes a view of a real-world environment including a room with various pieces of furniture such as a chair, a bookcase, a sofa, and some wall-hanging pictures. To determine the viewpoint 300, the AR product recommendation system 102 accesses motion-related information for a user client device (e.g., the user client device 108). For example, the AR product recommendation system 102 access an IMU, accelerometer, and/or gyroscope of the user client device 108 to determine movement of the user client device 108. Accordingly, the AR product recommendation system 102 can determine when the user client device 108 is moving quickly or moving slowly. Thus, the AR product recommendation system 102 can capture a frame of a camera feed received from the user client device 108 at a time instant when the user client device 108 satisfies a stillness threshold. To satisfy a stillness threshold, the AR product recommendation system 102 can determine that the user client device 108 is moving at a slow enough rate that the image of the camera feed is clear and stable. For instance, the AR product recommendation system 102 can use a stillness threshold that has units of angular velocity and/or linear velocity.

In addition, or alternatively, the AR product recommendation system 102 can determine a viewpoint by capturing a frame of a camera feed at a time instant during a user's application session (e.g., while the user 118 is using the AR client application 110) when the user spends more time than a time threshold without moving the user client device 108 (or without moving it more than a tolerance). The AR product recommendation system 102 can further determine a viewpoint (e.g., the viewpoint 300) based on user interactions with an AR product (e.g., AR table 202) that the user 118 has selected to overlay a view of the real-world environment of the camera feed within the AR client application 110. To illustrate, in addition (or alternatively) to determining a time instant where the user client device 108 is sufficiently still, the AR product recommendation system 102 can also capture a frame of the camera feed at a time instant when the user 118 has refrained from adjusting a location and/or orientation of an AR product within the AR client application 110 for at least a threshold time period.

In some embodiments, the AR product recommendation system 102 can determine a viewpoint based on user input. For example, the AR product recommendation system 102 can receive a user interaction with an element of the AR client application 110 (e.g. a camera capture button) to capture a frame to use as a viewpoint to analyze for generating recommended products. Thus, in these embodiments the AR product recommendation system 102 can determine a viewpoint when the user 118 aims the user client device 108 at a particular scene and elects to capture a frame of a real-world environment where the user 118 would like to see and interact with AR product overlays.

Figure 4:
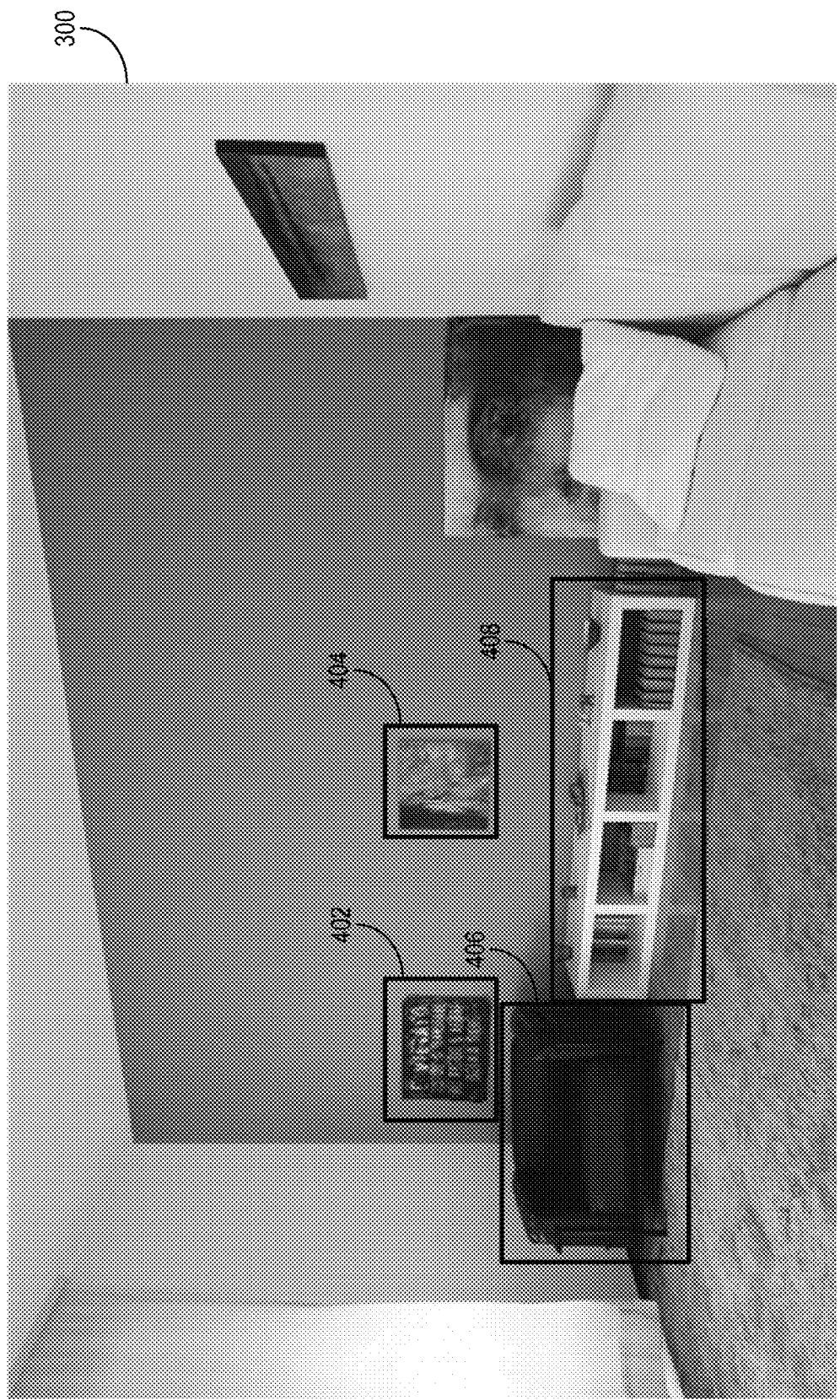
FIG. 4 illustrates identified real-world objects within a viewpoint in accordance with one or more implementations.

As mentioned, the AR product recommendation system 102 further analyzes the viewpoint 300 to identify real-world objects within the viewpoint 300. In particular, FIG. 4 illustrates identified real-world objects within the viewpoint 300. As illustrated, the AR product recommendation system 102 analyzes the viewpoint 300 and utilizes an object detection network such as an R-CNN to detect objects within the viewpoint. To elaborate, the AR product recommendation system 102 takes the viewpoint 300 as an input image for the R-CNN and generates object proposals (such as bounding boxes 402-408) with corresponding confidence scores and object labels.

To generate proposal regions of the viewpoint 300, the AR product recommendation system 102 implements a region proposal algorithm as part of the object detection network to hypothesize object locations within the viewpoint 300. In particular, the AR product recommendation system utilizes a region proposal network that shares full-image convolutional features with the object detection network (e.g., the R-CNN), thus enabling nearly cost-free region proposals. Indeed, by utilizing a region proposal network that shares features with the object detection network, the AR product recommendation system 102 improves computational efficiency over some conventional systems that require larger amounts of computer storage and processing power to manage networks that do not share such interoperability due to their independent generation of feature vectors.

In some embodiments, the AR product recommendation system 102 merges the region proposal network with a Fast R-CNN into a single unified network (e.g., by sharing convolutional features). Thus, by using attention mechanisms, the region proposal network can inform the unified network where to look within the viewpoint 300 to detect objects.

In these or other embodiments, to generate each of the bounding boxes 402-408, the AR product recommendation system 102 utilizes a fully-convolutional region proposal network that simultaneously predicts object bounds and object quality region proposals. The AR product recommendation system 102 further utilizes the predicted object bounds and object quality region proposals as input for a Fast R-CNN to detect objects within the viewpoint 300.

For example, the AR product recommendation system 102 can generate the bounding box 402 represented by two coordinate pairs, one for the top-left corner (x1, y1) and another for the bottom-right corner (x2, y2). Thus, for each bounding box corresponding to a different object identified within the viewpoint 300, the AR product recommendation system 102 can represent the set of all bounding boxes as:

$$B=\{b_1,b_2,\ldots,b_n\}$$

where B is the set of all bounding boxes, n is the total number of bounding boxes in the set, and each bounding box $b_i$ has a corresponding object label $l_i$ and confidence score $c_i$. An object label describes the object class of the object identified within the viewpoint (e.g., chair, sofa, handbag, skirt, etc.), and a confidence score describes a probability that a corresponding bounding box contains a real-world object with the given object label.

As mentioned, the AR product recommendation system 102 utilizes a region proposal network together with a Fast R-CNN. To elaborate on the Fast R-CNN, the AR product recommendation system 102 utilizes a Fast R-CNN that consists of three separate models. The first generates category-independent region proposals of the viewpoint 300. The second is a large CNN that extracts a fixed-length feature vector from each proposed region. The third model is a set of class-specific linear support vector machines ("SVM's"). To implement the Fast R-CNN, the AR product recommendation system 102 can utilize the networks and techniques described in Ross Girshick, Jeff Donahue, Trevor Darrell, Jitendra Malik, *Rich Feature Hierarchies for Accurate Object Detection and Semantic Segmentation*, UC Berkeley (2014), which is incorporated herein by reference in its entirety.

To elaborate on how the AR product recommendation system 102 detects the objects indicated by the bounding boxes 402-408, the AR product recommendation system utilizes a Fast R-CNN to generate a convolutional feature map of the viewpoint 300. On top of the convolutional features of the feature map, the AR product recommendation system 102 utilizes a region proposal network which consists of two additional convolutional layers: one that encodes each convolutional map position into a short feature vector, and another one that, at each convolutional map position, outputs an object score and regressed bounds for k region proposals relative to various scales and aspect ratios for the given location.

To generate region proposals using the region proposal network, the AR product recommendation system 102 slides a small network over the convolutional feature map output by the previous shared convolutional layer. The small network is fully connected to an n×n spatial window of the input convolutional feature map. The AR product recommendation system 102 maps each sliding window to a lower-dimensional vector and feeds the lower-dimensional vector into two sibling fully-connected layers—a box regression layer and a box classification layer.

At each sliding window location, the AR product recommendation system 102 simultaneously predicts k region proposals and parameterizes the k proposals relative to k reference boxes. The AR product recommendation system 102 centers each reference box at a respective sliding window and associates the reference box with a corresponding scale and aspect ratio. In this way, the AR product recommendation system 102 takes the viewpoint 300 and outputs bounding boxes, such as bounding boxes 402-408, which indicate locations of real-world objects such as a chair, painting, bookcase, etc. The AR product recommendation system 102 returns an object label and a confidence score for each bounding box. The object label indicates a class of the object. To illustrate, the AR product recommendation system 102 can classify objects with object labels such as "chair" and "bookcase." The confidence score can indicate a confidence that an object in a bounding box corresponds to the determined object label. Details regarding object detection are included in the previously incorporated *Rich Feature Hierarchies for Accurate Object Detection and Semantic Segmentation.*

Based on categorizing the objects, the AR product recommendation system 102 can select particular identified objects that are more relevant to the user 118. For example, given that the user 118 selected an AR object 202 of a table (as shown in FIG. 2) while operating the AR client application 110, the AR product recommendation system 102 can determine that, because the AR object 202 is within the object category of "furniture," then only other objects that also fall within the same object category are relevant to the user 118. Thus, the AR product recommendation system 102 can determine that, in FIG. 4, only the chair and the bookcase, indicated by bounding boxes 406 and 408 respectively, are relevant to the user 118 because they also correspond to the furniture category. Based on this determination, the AR product recommendation system 102 can ignore the paintings because they are categorized in a different object category.

In the same or other embodiments, the AR product recommendation system 102 trains the R-CNN and the region proposal network to share convolutional features by implementing an alternating optimization technique. Indeed, the AR product recommendation system 102 can train the R-CNN and the region proposal network by implementing a training scheme that alternates between fine-tuning for the region proposal task and then fine-tuning for object detection, while keeping the proposals fixed. By utilizing this scheme, the AR product recommendation system 102 converges quickly and produces a unified network with convolutional features that are shared between both tasks.

In addition, the AR product recommendation system 102 can apply a loss function as part of the training process to reduce a measure of loss or error for the region proposal network. Thus, by reducing the loss, the AR product recommendation system 102 tunes the region proposal network to more accurately identify regions of the viewpoint 300 likely to contain objects. For example, the AR product recommendation system 102 can implement the loss function described in Shaoqing Ren, Kaiming He, Ross Girshick, Jian Sun, *Faster R-CNN: Towards Real-Time Object Detection with Region Proposal Networks*, Advances in Neural Information Processing Systems (NIPS) (2015), which is incorporated herein by reference in its entirety.

Based on the viewpoint 300, the AR product recommendation system 102 determines a location and orientation of the identified real-world objects. To elaborate, the AR product recommendation system 102 utilizes correlation filters in the viewpoint 300 to determine an orientation or pose of the identified objects. For instance, the AR product recommendation system 102 can implement a spatial-frequency array that is specifically designed from a set of training patterns that are representative of a particular pattern class, as described in Vishnu Naresh Bodetti, Takeo Kanade, B. V. K. Vijaya Kumar, *Correlation Filters for Object Alignment*, Proceedings of the IEEE Conference on Computer Vision and Pattern Recognition (2013), which is incorporated herein by reference in its entirety.

To train correlation filters, the AR product recommendation system 102 utilizes training images that include objects with respective object labels that describe the class or type of the object depicted (e.g., table, chair, handbag, etc.). The AR product recommendation system 102 thus utilizes a predetermined number of images of objects of a particular class (e.g., tables) on a monochromatic background where the object is depicted separately in various orientations. To illustrate, for N training images, the correlation filter design problem is posed as an optimization problem:

$$\min_{f} \frac{1}{N} \sum_{i=1}^{N} \|x_i \otimes f - g_i\|_2^2 + \lambda \|f\|_2^2$$

where $\otimes$ denotes a convolution operation, $x_i$ is the $i^{th}$ training image, f is a correlation filter template such as a spatial-frequency array or a template in the image domain, $g_i$ is the desired correlation output for the $i^{th}$ training image, and $\lambda$ is the regularization parameter.

Indeed, the AR product recommendation system 102 can solve the above optimization problem to generate the following closed-form expression for a correlation filter:

$$\hat{f} = \left[\lambda I + \frac{1}{N} \sum_{i=1}^{N} \hat{X}_i^* \hat{X}_i\right]^{-1} \left[\frac{1}{N} \sum_{i=1}^{N} \hat{X}_i^* \hat{g}_i\right]$$

where $\hat{x}_i$ denotes a Fourier transform of $x_i$, $\hat{X}_i$ denotes the diagonal matrix whose diagonal entries are the elements of $\hat{x}_i$, * denotes a conjugate transpose, and I denotes the identity matrix of appropriate dimensions.

By using the above method to determine a location and an orientation (or pose) of the real-world objects within the two-dimensional image of the viewpoint 300, the AR product recommendation system 102 can intelligently determine a location and orientation to use for AR products to replace the real-world objects within the real-world environment of the camera feed.

By utilizing correlation filters, the AR product recommendation system 102 controls the shape of the cross-correlation output between the image (e.g., the viewpoint 300) and the filter by minimizing the average mean squared error between the cross-correlation output and the ideal desired correlation output for an authentic (or impostor) input image. By explicitly controlling the shape of the entire correlation output using correlation filters, the AR product recommendation system 102 achieves more accurate local estimation that conventional systems that utilize traditional classifiers.

Figure 5A:
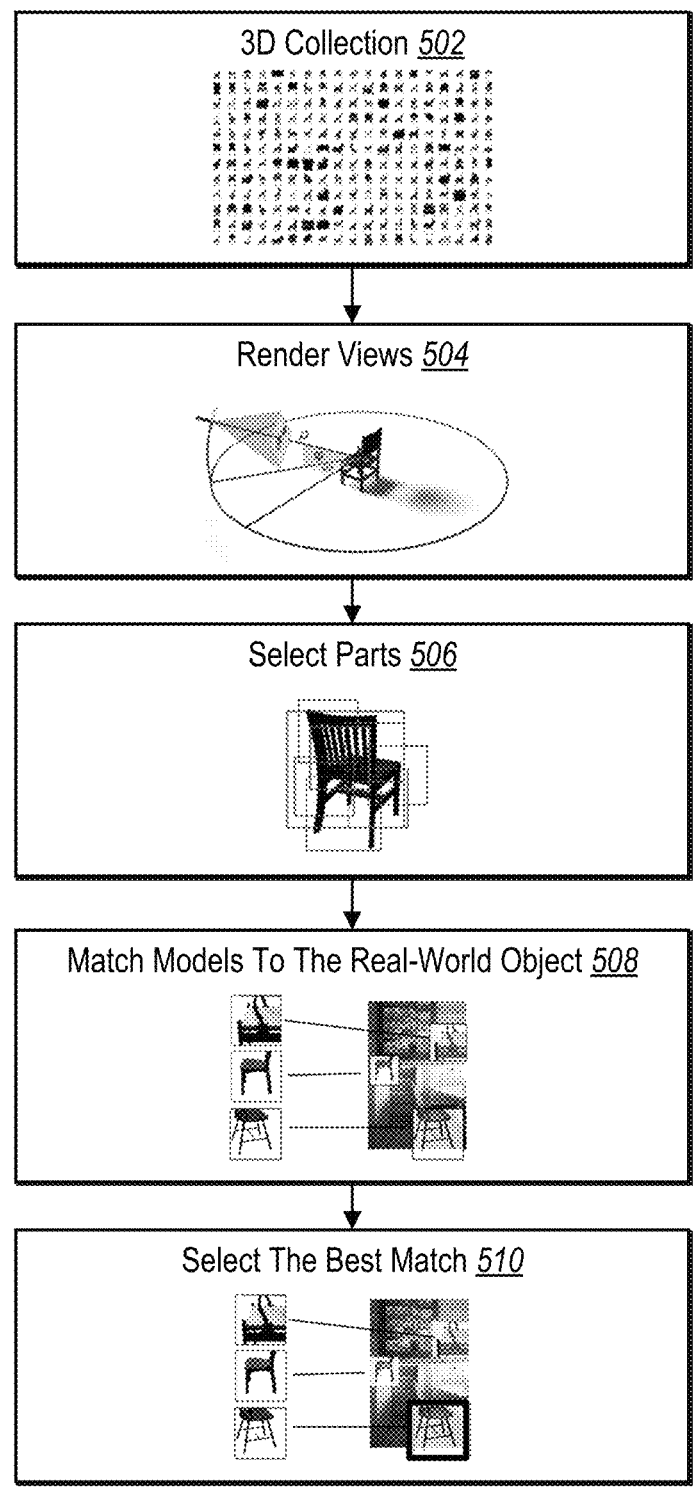

As mentioned, the AR product recommendation system 102 identifies a three-dimensional model that matches an identified real-world object. The identified real-world object for which the AR product recommendation system 102 determines a matching three-dimensional model for the basis for identifying a style for a recommended AR product. FIGS. 5A-5B illustrate an overview of a 2D-3D alignment algorithm for identifying a three-dimensional model from the model database 112 that matches a real-world object, such as the chair indicated by the bounding box 406 of FIG. 4. To illustrate, FIG. 5A shows a flow of a series of acts by which the AR product recommendation system 102 can match a three-dimensional model to a real-world object—a chair in the example.

As shown, the AR product recommendation system 102 can access a 3D collection 502 of three-dimensional models within the model database 112. In addition, the AR product recommendation system 102 can select a three-dimensional model from among the plurality of three-dimensional models within the 3D collection 502. To select a matching three-dimensional model, the AR product recommendation system 102 can analyze three-dimensional models within the model database 112 that match the object label associated with the identified real-world object 302. For example, the real-world object within the bounding box 402 has an object label of "chair." Thus, the AR product recommendation system 102 analyzes three-dimensional models that are of the same class or that have the same label—the AR product recommendation system 102 analyzes chairs within the model database 112.

In analyzing chairs within the model database 112, the AR product recommendation system 102 analyzes chairs of various styles, each at different orientations to establish part-based correspondences between the three-dimensional models and the real-world object within bounding box 402. Indeed, the AR product recommendation system 102 can perform act 504 to render various views of a given three-dimensional model. To elaborate, the AR product recommendation system 102 represents a given three-dimensional model using a set of view-dependent mid-level visual elements learned from synthesized views in a discriminative fashion.

To elaborate on how the AR product recommendation system 102 performs act 504 to render various views of a three-dimensional model, the AR product recommendation system 102 searches for a patch x* in the input image (e.g., the viewpoint 300) that maximizes the following linear classifier score that is dependent on q:

$$S_q(x) = w_q^T x$$

where $w_q$ is a vector of learned weights for the classifier dependent on q, wherein the weight $w_q$ emphasizes feature dimensions that are discriminative for a patch's appearance. Indeed, as described in further detail below with reference to FIG. 5B, the AR product recommendation system 102 determines a visual element 512 that corresponds to an identified real-world object based on the classifier score $w_q^T x$.

Given a rendered view for a given three-dimensional model, the AR product recommendation system 102 learns the weights $w_q$ by training an exemplar classifier using the patch q as a single positive example and a large number of negative patches $x_i$ for i=1 to N. In some embodiments, the AR product recommendation system 102 determines $w_q$ analytically via a linear discriminant analysis ("LDA"). Thus, the AR product recommendation system 102 can represent weights by:

$$w_q = \Sigma^{-1}(q - \mu_n)$$

where $$\mu_n = \frac{1}{N}\sum_{i=1}^{N} x_i$$

and the AR product recommendation system 102 estimates $$\Sigma = \frac{1}{N}\sum_{i=1}^{N}(x_i - \mu_n)(x_i - \mu_n)^T$$

from a large set of histogram of oriented gradients ("HOG") descriptors $\{x_i\}$ extracted from patches sampled from a set of negative images.

In addition, the AR product recommendation system 102 further performs act 506 to select parts of a three-dimensional model to test for matching to the real-world object indicated by bounding box 402. Indeed, the AR product recommendation system 102 calibrates individual element detectors of the 2D-3D alignment algorithm based on a common dataset of negative images (e.g., images that do not contain the real-world object of interest). For instance, the AR product recommendation system 102 utilizes the following affine calibration of the equation mentioned above in relation to act 504:

$$S'_q(x) = a_q S_q(x) + b_q$$

where for each visual element detector the AR product recommendation system 102 seeks to find the scalars $a_q$ and $b_q$.

The AR product recommendation system 102 also matches visual elements of the three-dimensional model to the real-world object for small mutual deformations while preserving viewing angle and style constraints, as shown by act 508 of FIG. 5A. To test a three-dimensional model for similarity to the real-world object, the AR product recommendation system 102 applies all learned visual elements of the three-dimensional model to those of the real-world object in parallel. In this manner, the AR product recommendation system 102 determines a spatially consistent and appearance-consistent alignment to the real-world object, while preserving style similarity restraints.

To elaborate on how the AR product recommendation system 102 matches a three-dimensional model to a real-world object based on selected parts, the AR product recommendation system 102 enforces a consistent spatial layout of visual element detections corresponding to a rendered view of a three-dimensional model. More specifically, for all visual elements for a given view of a three-dimensional model, the AR product recommendation system 102 determines a dense response map across different spatial scales of the 2D viewpoint 300. For each visual element, the AR product recommendation system 102 considers the 2D patch locations whose response exceeds a particular threshold, and the AR product recommendation system 102 utilizes these patches to determine detection scores of remaining visual elements centered around their expected 2D locations.

As further illustrated in FIG. 5A, the AR product recommendation system 102 performs act 510 to select the best match for the real-world object indicated by bounding box 402. Indeed, the AR product recommendation system 102 selects a three-dimensional model that best matches the given real-world object. As part of identifying a three-dimensional model that matches an identified real-world object, FIG. 5B illustrates applying a histogram of oriented gradients ("HOG") classifier technique to three-dimensional models stored within the model database 112.

As shown, and as described above in relation to FIG. 5A, the AR product recommendation system 102 selects a visual element 512 of a particular three-dimensional model (e.g., the chair illustrated in FIG. 5B). In addition, the AR product recommendation system 102 selects discriminative visual elements by densely determining the squared whitened norm response at multiple spatial scales. In some embodiments, the AR product recommendation system 102 selects a particular number of visual elements (e.g., 10) per rendered 3D view of a three-dimensional model. In particular, the AR product recommendation system 102 selects visual elements that have the highest response after non-maximum suppression.

For non-maximum suppression, the AR product recommendation system 102 can implement an appropriate intersection-area-to-union ratio (e.g., 0.25). The AR product recommendation system 102 can further utilize square patches of particular dimensions (e.g., 100 by 100 pixels) to select visual elements (e.g. visual element 512). By filtering visual elements in this way, the AR product recommendation system 102 removes small, spurious patches that could be considered "noise" in the analysis.

The AR product recommendation system 102 further applies a HOG 514 to extract contrast-insensitive features from HOG cells of a given dimension (e.g., 10 by 10 pixels) to product a feature vector of a particular dimension (e.g., 900 dimensions). The AR product recommendation system 102 can also set to zero components of $w_q$ that correspond to spatial bins that have a sum of absolute values across the HOG channels less than a given value (e.g., 0.01). For example, the AR product recommendation system 102 can apply a HOG mask 516 to the visual element 512 as illustrated in FIG. 5B.

Thus, the AR product recommendation system 102 can generate a masked classifier 520 based on a given HOG classifier 518 applied to the HOG 514. By applying the HOG mask 516, the AR product recommendation system 102 can reduce the effect of gradients in the classifier 518 that are not relevant to the visual element 512 (e.g., the circled gradients shown in the classifier 518). Indeed, by applying the HOG mask 516, the AR product recommendation system 102 thereby effectively down weights background (e.g., white) pixels within the rendered views and focuses detector weights on the foreground three-dimensional model (e.g., the chair). Accordingly, the AR product recommendation system 102 generates the masked classifier 520 to identify a visual element (e.g., visual element 512) that corresponds to an identified real-world object based on the classifier score $w_q^T x$.

In some embodiments, the AR product recommendation system 102 utilizes the 2D-3D alignment algorithm described in Mathieu Aubry, Daniel Maturana, Alexei A. Efros, Bryan C. Russell, Josef Sivic, *Seeing 3D Chairs: Exemplar Part-based 2D-3D Alignment Using a Large Dataset of CAD Models*, CVPR (2014), which is incorporated by reference herein in its entirety.

As mentioned, the AR product recommendation system 102 further generates recommended products based on style similarity. In particular, once the AR product recommendation system 102 identifies a three-dimensional model, the AR product recommendation system 102 identifies a product having a style that matches the style of the identified three-dimensional model.

Figure 6A:
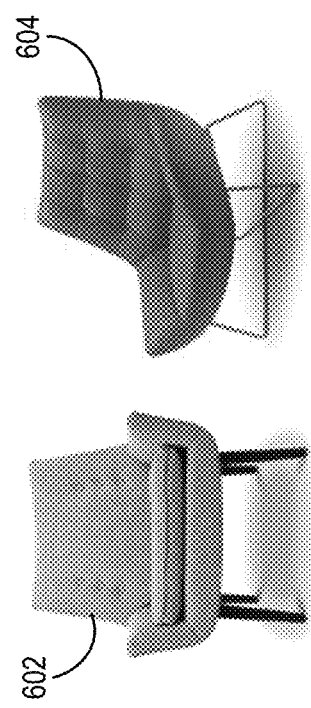
FIGS. 6A-6B illustrate similar recommended products generated by utilizing a style similarity algorithm in accordance with one or more implementations.
Figure 6B:
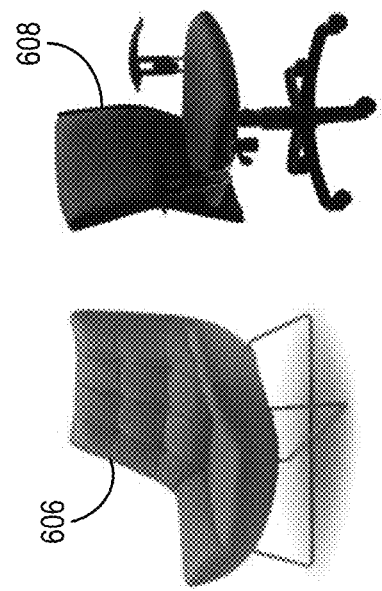

Indeed, FIGS. 6A-6B illustrate a visual representation of utilizing a style similarity algorithm to generate recommended products. In particular, the AR product recommendation system 102 analyzes a plurality of products stored within the product database 114 to determine, for a given product, a probability of being stylistically similar to a given three-dimensional model. In addition, the AR product recommendation system 102 ranks products based on their relevance to the user 118—i.e., based on their respective probabilities of matching a given three-dimensional model.

To elaborate on implementing the style similarity algorithm, the AR product recommendation system 102 utilizes crowdsourced preference data (e.g., collected via AMAZON MECHANICAL TURK) to generate parameters of the style similarity algorithm. In particular, the AR product recommendation system 102 collects information about which products people consider to be similar. Based on the generated parameters, the AR product recommendation system 102 can determine a dissimilarity between any pair of shapes (e.g., objects and/or products) by implementing the style similarity algorithm. For example, the AR product recommendation system 102 can utilize the style similarity algorithm for candidate products (e.g., 3D product models) within the product database 114 to determine a dissimilarity—and, as a result, a similarity—with an identified three-dimensional model from the model database 112. For the $i^{th}$ candidate product, the AR product recommendation system 102 can determine a normalized similarity score $\alpha_i$ that denotes its style similarity on a scale from 0 to 1, given by:

$$\alpha_i = \frac{1}{1 + d_i}$$

where $d_i$ is the distance of the product (e.g., a measure of similarity or dissimilarity) from a given three-dimensional model.

As illustrated in FIGS. 6A-6B, the AR product recommendation system 102 generates a similarity score between various models (e.g., between an identified three-dimensional model and a given model of a product). For example, the AR product recommendation system 102 generates a similarity score of 0.76 between the models of the chairs illustrated in FIG. 6A. Indeed, as shown in FIG. 6A, the chair 602 is similar in structure and appearance to the chair 604. Thus, the AR product recommendation system 102 implements a style similarity algorithm to generate a similarity score (between 0 and 1) that indicates a measure of similarity between the chair 602 and the chair 604.

For comparison, FIG. 6B illustrates models of two chairs that are less structurally and stylistically similar than the chairs in FIG. 6A. As a result, the AR product recommendation system 102 implements the style similarity algorithm to generate a similarity score between the chair 606 and the chair 608 of 0.42. Therefore, the AR product recommendation system 102 can determine that the chairs 602 and 604 are more similar than the chairs 606 and 608. As illustrated, the chair 604 in FIG. 6A is the same as the chair 606 in FIG. 6B. Thus, by utilizing the style similarity algorithm, the AR product recommendation system 102 can compare other chairs with the chair 604/606. Indeed, the AR product recommendation system 102 can determine that the chair 602 of FIG. 6A is more similar to the chair 604/606 than is the chair 608 of FIG. 6B. While FIGS. 6A and 6B illustrate comparing the style between two objects of the same class (e.g., two chairs). In other embodiments, the AR product recommendation system 102 can compare the style of objects of different classes. For example, the AR product recommendation system 102 can compare the style of a chair and a table, a chair and a sofa, etc.

In some embodiments, the AR product recommendation system 102 ranks the results of the similarity scores. For instance, the AR product recommendation system 102 can rank those products with higher similarity scores ahead of those products with lower similarity scores. Thus, as illustrated in FIGS. 6A-6B, the AR product recommendation system 102 can rank the chair 602 above the chair 608, when compared with the chair 604/606 as a reference three-dimensional model.

To elaborate on the style similarity algorithm, the AR product recommendation system 102 can take input in the form of a pair of 3D models—a three-dimensional model identified from the model database 112 as matching a real-world object depicted within the viewpoint 300 and a 3D model of a product identified from the product database 114. The AR product recommendation system 102 identifies matching elements between the pair of input models by segmenting the input models into approximately convex patches at multiple scales. Indeed, the AR product recommendation system 102 utilizes the convex patches as initial seeds to the algorithm to detect elements.

In addition, the AR product recommendation system 102 examines the similarity between pairs of patches from the two input models by approximately aligning the patches with an affine transformation and then evaluating the distance measure between the patches expressed as a weighted combination of elementary distances of individual geometric features (e.g., surface point-to-point distance, feature curves distance, or curvature histogram distance). The AR product recommendation system 102 further groups into elements pairs of patches that have high similarity between them.

To determine a similarity score between a three-dimensional model and a product, the AR product recommendation system 102 further determines similarity between matching elements by determining a prevalence of matching elements and a saliency of matching elements. To illustrate, the AR product recommendation system 102 can determine a saliency between matching elements by determining a weighted combination of geometric features such as surface point-to-point distance, feature curves distance, or curvature histogram distance, given by:

$$\text{saliency}(E_{matched}) = \sum_{\substack{surface \\ points}} \sigma(v_1 \times s_1(F_1) + v_2 \times s_2(F_2) + v_3 \times s_3(F_3) + ...)$$

where $E_{matched}$ represents a matching element of a model, $\sigma$ is a sigmoid function $$\sigma = \frac{1}{1+e^{-x}}, v_i$$

is a learned weight per metric, $s_i$ are the elementary saliency metrics measured at a sample point s, and $F_i$ are the various geometric features.

In addition, the AR product recommendation system 102 can determine a prevalence between matching elements. Indeed, the AR product recommendation system 102 can determine a percentage of area on each input model that is not covered by any matching elements and can further weight the unmatched areas by their respective saliency. In some embodiments, the AR product recommendation system 102 can determine a prevalence by:

$$D_{prevalence}(E, E') = \frac{\text{saliency}(A_{unmatched}) + \text{saliency}(A'_{unmatched})}{2} \cdot t$$

where E is a given element of a three-dimensional model, E' is a corresponding element of a product from the product database 114, $A_{unmatched}$ is an unmatched area of the element E, $A'_{unmatched}$ is an unmatched area of the element E', and t is a learned penalty parameter.

As mentioned above, the AR product recommendation system 102 learns the parameters for the style similarity algorithm (e.g., the weights for the saliency term, the weights for the prevalence term, and the penalty parameter of the prevalence term) using crowdsourcing techniques such as an AMAZON MECHANICAL TURK study. In addition, based on determining the saliency and the prevalence, the AR product recommendation system 102 determines a similarity score between a three-dimensional model and a product on a scale of 0 to 1, given by:

$$a_i = \frac{1}{1+d_i}$$

where $d_i$ is the distance of the product (e.g., a measure of similarity or dissimilarity) from a given three-dimensional model. In some embodiments, the AR product recommendation system 102 implements a style similarity algorithm using techniques and methods described in Zhaoliang Lun, Evangelos Kalogerakis, Alla Sheffer, *Elements of Style: Learning Perceptual Shape Style Similarity*, ACM Transactions of Graphics, Proc. ACM SIGGRAPH (2015), which is incorporated herein by reference in its entirety.

As mentioned, the AR product recommendation system 102 removes identified real-world objects from the real-world environment of the camera feed (e.g., from the viewpoint 300). Indeed, FIGS. 7A-7D illustrate removing the chair indicated by the bounding box 406 in FIG. 4 and replacing the chair with representations of candidate products. To remove the chair (or any other identified object), the AR product recommendation system 102 implements an auto selection technique such as the auto selection technique of ADOBE SENSEI or the 2018 release of ADOBE PHOTOSHOP ELEMENTS to find a precise object mask and remove the identified object.

In particular, the AR product recommendation system 102 can detect the bounds of the given object—the chair—within its bounding box 406 and can remove the object using a fill technique to match surrounding colors and textures. Indeed, the AR product recommendation system 102 can remove an object and fill its place to appear seamless with the background (e.g., the viewpoint 700). For example, the AR product recommendation system 102 can utilize a context-aware fill technique such as the context-aware fill technique of ADOBE SENSEI to fill the removed portion of the viewpoint 700 to match surrounding colors and textures.

To trigger removal of an object, the AR product recommendation system 102 can receive a user input to select the object and to elect to remove the selected object. In some embodiments, the AR product recommendation system 102 can determine which real-world object to remove based on an object class selected by the user 118. For instance, the AR product recommendation system 102 can receive a user input to indicate an object class of "chair," and the AR product recommendation system 102 can identify a chair within the viewpoint to remove. In these or other embodiments, the AR product recommendation system 102 can analyze the viewpoint to identify a real-world object that is the least stylistically similar or that fits within the viewpoint the least and can determine to remove that object.

Figure 7B:
FIGS. 7A-7D illustrate AR scenes generated by replacing identified real-world objects with candidate products to use as a basis for determining color compatibility in accordance with one or more implementations.
Figure 7D:
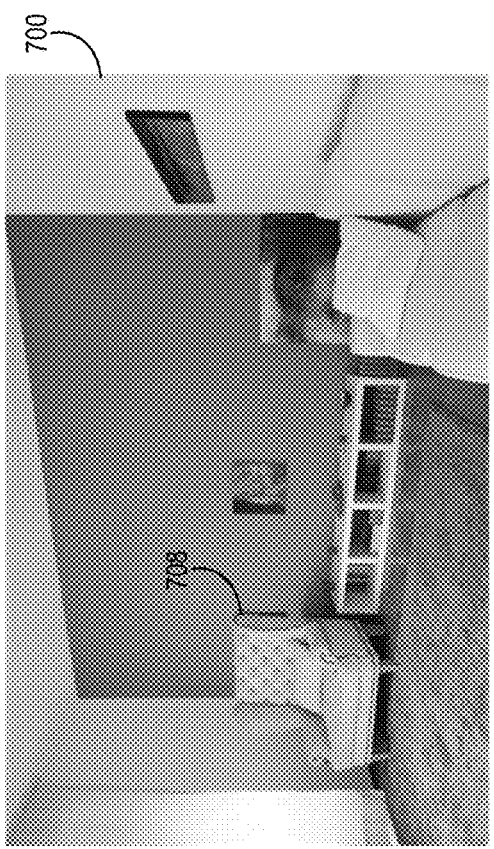
Figure 7A:
Figure 7C:
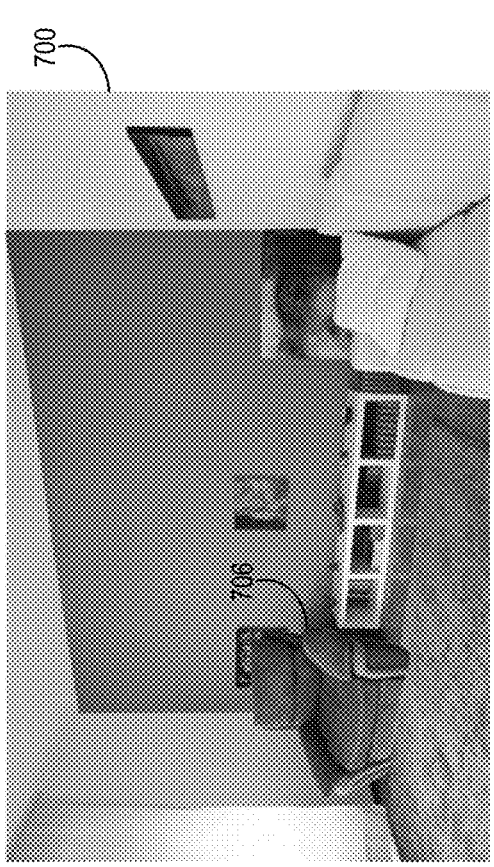
Figure 9A:
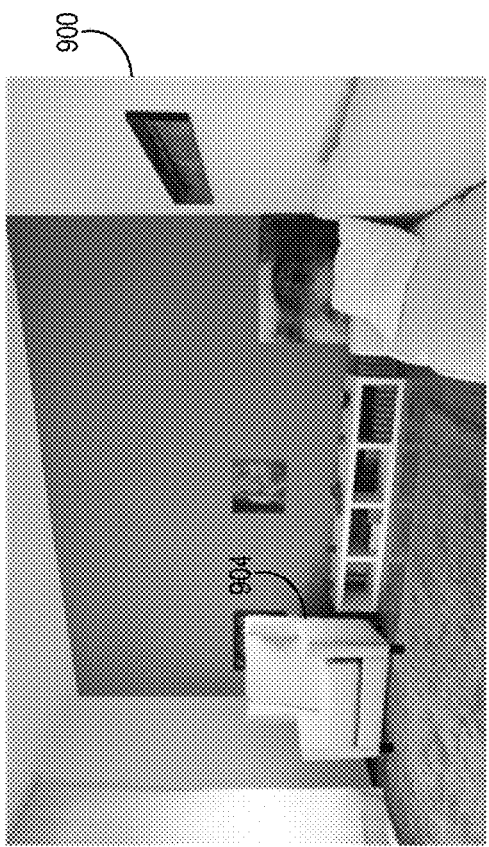
FIGS. 9A-9D illustrate AR scenes including embedded AR representations of recommended products within the AR scenes in accordance with one or more implementations.
Figure 9B:
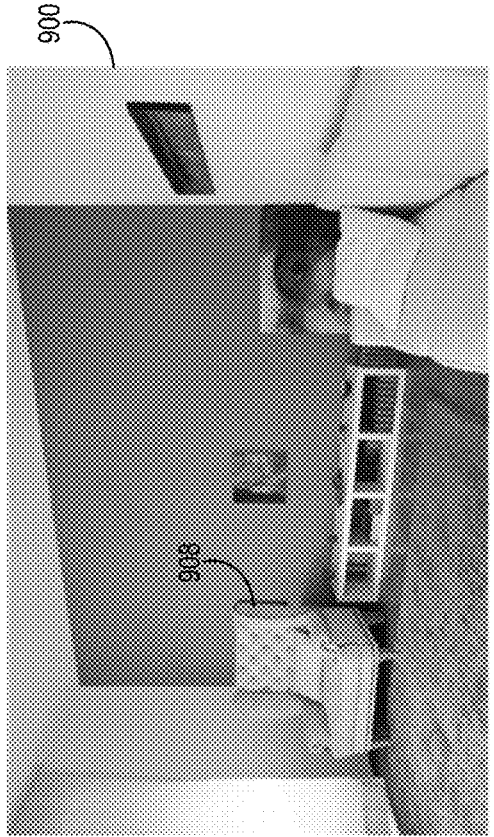
Figure 9C:
Figure 9D:
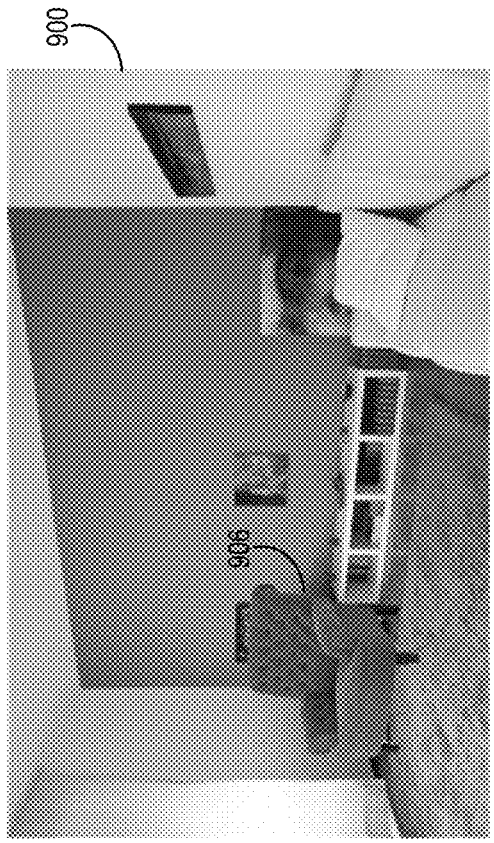

In addition, the AR product recommendation system 102 embeds the stylistically similar product models identified from the product database 114 within the viewpoint 700 to replace the removed real-world object. As shown in FIG. 7A, for example, the AR product recommendation system 102 identifies the product 702 as similar to the chair indicated by the bounding box 406 by utilizing the above-described style similarity algorithm. Thus, by implementing the context-aware removal and fill techniques described above, and based on determining the location and orientation of the chair, the AR product recommendation system 102 embeds the AR representation of the product 702 within the viewpoint 700. Likewise, the AR product recommendation system 102 embeds AR representations of the products 704-708 within the viewpoint 700 as well.

Indeed, in some embodiments, the AR product recommendation system 102 embeds multiple selected AR products into separate versions of the viewpoint 700 to enable the user 118 to select between them. In these embodiments, the AR product recommendation system 102 can enable the user 118 to choose and alternate between AR products to see what each one would look like when placed in the real-world environment of the camera feed. In other embodiments, however, the AR product recommendation system 102 embeds only a single highest-ranked AR product within the viewpoint 700.

As mentioned, the AR product recommendation system 102 can generate a three-dimensional AR representation using stored models of products within the product database 114. For example, as illustrated in FIG. 7A, the AR product recommendation system 102 can overlay the AR representation of the product 802 on a view of the real-world environment of the camera feed (e.g., the viewpoint 700). The AR product recommendation system 102 can generate the AR representation of the product 702 and can place the AR representation to be world-fixed so that it appears placed at a particular location within the real-world environment. Indeed, as described above, the AR product recommendation system 102 can place the recommended AR product 702 using a location and an orientation determined based on the location and orientation determined for the corresponding real-world object.

To generate the AR representations of the products 702-708, the AR product recommendation system 102 can utilize an embedding technique in conjunction with the above-described style similarity algorithm to generate accurate representations that fit the real-world environment to replace a removed real-world object. To illustrate, the AR product recommendation system 102 embeds the candidate recommended products in available textures within the frame of the camera feed captured to determine the viewpoint 700. In addition, the AR product recommendation system 102 normalizes candidate recommendations to have the reference in terms of rotation, translation, and scale. In some embodiments, the AR product recommendation system 102 can access a third-party service (e.g., an API) to normalize recommended product representations with proper rotation, translation, and scale.

As mentioned, the AR product recommendation system 102 further implements a color compatibility algorithm based on the embedded images 702-708. Indeed, the AR product recommendation system 102 utilizes a color compatibility algorithm to select textures that are color-compatible with the scene depicted within the viewpoint 700. As part of the color compatibility algorithm, the AR product recommendation system 102 determines a color compatibility measure by extracting a theme of a given number (e.g., five) colors from an AR representation of a recommended product. To extract the color theme, the AR product recommendation system 102 minimizes an objective function to represent or suggest an image:

$$\max_t \alpha \cdot r(t) - \frac{1}{N} \sum_i \min_{1 \le k \le 5} (\max(\|c_i - t_k\|_2, \sigma)) - \frac{\tau}{M} \max_k \sum_{j \in N(t_k)} \max(\|c_j - t_k\|_2, \sigma)$$

where r(t) is a rating of theme t, $c_i$ is a pixel color, $t_k$ is a theme color, N is the total number of pixels, σ is a distance threshold, and α and τ are the learning rate parameters. By utilizing the first term, $$\max_t \alpha \cdot r(t),$$

the AR recommendation system 102 measures the quality of the extracted theme. By utilizing the second term, $$\frac{1}{N} \sum_i \min_{1 \le k \le 5} (\max(\|c_i - t_k\|_2, \sigma)),$$

the AR product recommendation system penalizes dissimilarity between each image pixel $c_i$ and the most similar color $t_k$ within the theme. By utilizing the third term, $$\frac{\tau}{M} \max_k \sum_{j \in N(t_k)} \max(\|c_j - t_k\|_2, \sigma),$$

the AR product recommendation system 102 penalizes dissimilarity between theme colors $t_k$ and the M most similar image pixels N(t) to prevent theme colors from drifting from the image. In some embodiments, the AR product recommendation system 102 uses set values such as M=N/20, τ=0.025, α=3, and σ=5. In addition, the AR product recommendation system 102 can utilize a DIRECT algorithm for optimization to perform a deterministic global search without requiring overly-intensive initialization. For example, the AR product recommendation system 102 can utilize the DIRECT algorithm as set forth in Donald R. Jones, Cary D. Perttunen, Bruce E. Stuckman, *Lipschitzian Optimization Without the Lipschitz Constant*, Journal of Optimization Theory and Applications 79.1, 157-181 (1993), which is incorporated herein by reference in its entirety.

The AR product recommendation system 102 thus generates themes of a set number of colors (e.g., five) and scores each theme using a regression model. Indeed, the AR product recommendation system 102 generates, from an input theme t, a feature vector of a number (e.g., 326) features including colors, differences, principal component analysis ("PCA") features, hue probability, hue entropy, etc.

In addition, the AR product recommendation system 102 can utilize a LASSO ("least absolute shrinkage and selection operator") regression model with an L1 norm on the weights to apply to the generated feature vector y(t). In this manner, the AR product recommendation system 102 automatically selects the most relevant features and rates a given color theme on a scale from 1 to 5. The AR product recommendation system 102 can utilize a LASSO regressor that is a linear function of the features given by:

$$r(t) = w^T y(t) + b$$

learned with L1 regularization:

$$\min_{w,b} \sum_i (w^T y_i + b - r_i)^2 + \lambda \|w\|_1$$

where r(t) is the predicted rating of the input theme, and w and b are the learned parameters. Thus, for each embedded real-world object corresponding to a candidate recommendation within the viewpoint 700, the AR product recommendation system extracts a theme and passes the theme through the regression model. Accordingly, for the $i^{th}$ candidate, if $t_i$ is the extracted theme, the AR product recommendation system 102 associates a normalized score $\beta_i$ that denotes its color compatibility with the viewpoint 700 on a scale from 0 to 1. In some embodiments, the AR product recommendation system 102 generates the color compatibility as follows:

$$\beta_i = \frac{r(t_i) - 1}{5 - 1}$$

where the user-based ratings range from 1 to 5. In this way, the AR product recommendation system 102 generates the color compatibility score by subtracting the rating by a minimum possible rating and then dividing the result by the difference of the maximum possible rating and a minimum possible rating (e.g., 5-1). In some embodiments, the AR product recommendation system 102 utilizes the color compatibility algorithm set forth in Peter O'Donovan, Aseem Agarwala, Aaron Hertzmann, *Color Compatibility from Large Datasets*, ACM Transactions on Graphics, 30, 43, Proc. SIGGRAPH (2011), which is incorporated herein by reference in its entirety.

As mentioned, the AR product recommendation system 102 further determines overall scores for recommended products. Indeed, FIG. 8 illustrates a table of weights and corresponding accuracies for determining overall scores. To determine the overall scores, the AR product recommendation system 102 utilizes the determined style similarity score $\alpha$ along with the determined color compatibility score $\beta$. For example, the AR product recommendation system 102 determines an overall score $\gamma_i$ for the $i^{th}$ candidate as a linear combination of the style similarity score and the color compatibility score, given by:

$$\gamma_i = w_1 \alpha_i + w_2 \beta_i$$

where $w_1$ represents the weight of the style similarity and $w_2$ represents the weight of the color compatibility.

To determine the weights $w_1$ and $w_2$, the AR product recommendation system 102 can utilize a rank-SVM algorithm, as mentioned above. By implementing a rank-SVM technique, the AR product recommendation system 102 employs a pair-wise ranking method based the ground truth ranking of objects/products. The AR product recommendation system 102 determines the weights corresponding to each score based on the importance of the score in ranking the products. Indeed, the AR product recommendation system 102 can train the rank-SVM to generate weights based on training data in the form of ground truth ranking and input scores. Thus, given a score, the AR product recommendation system 102 can utilize the rank-SVM to generate a predicted weight.

As part of training the rank-SVM, the AR product recommendation system 102 can utilize a collection of lists (e.g., 6 lists) of images with a particular number of unique views (e.g., 6 unique views), with each view having a unique identified object. For the identified object within each view, the AR product recommendation system 102 embeds a number (e.g., 9) of candidate AR representations of products with local orientation and scale similar to the identified object of the view. The AR product recommendation system 102 further determines the style similarity score $\alpha$ and the determined color compatibility score $\beta$ for each candidate product recommendation (e.g., 6*9=54) with respect to their corresponding identified objects.

As an additional part of training the rank-SVM, the AR product recommendation system 102 collects survey information from participants who ranked product recommendations based on style similarity to a given reference object. For example, the AR product recommendation system 102 can collect 10 survey results for each of the 9 images in the 6 different lists. In some embodiments, the AR product recommendation system 102 collects 10 responses per list. Utilizing a rank aggregation technique, the AR product recommendation system 102 can establish a ground truth to determine average rankings of the products from different participant rankings, and based on the average rankings, the AR product recommendation system 102 can further determine the final ground truth ranking by ranking the averages. In some embodiments, the AR product recommendation system 102 employs the rank-SVM technique described in Thorsten Joachims, *Optimizing Search Engines using Clickthrough Data*, Proceedings of the ACM Conference on Knowledge Discovery and Data Mining (2003), which is incorporated herein by reference in its entirety.

Because the AR product recommendation system 102 obtains an appropriate (relatively high) Kendall-Tau rank correlation (e.g., 0.74), including ties, among the average ranking and the individual rankings, utilizing the above-described ranking method is justified. The higher Kendall-Tau rank correlation signifies that participants in the survey suggest similar rankings for products.

In some embodiments, the AR product recommendation system 102 further splits the dataset for training, validation, and testing after determining the ground truth ranking for each list. Indeed, given the above example, the AR product recommendation system 102 utilizes a total of $$\binom{9}{2} * 6 = 216$$

total pairs of product/object comparisons. Upon performing a 4:1:1 split of the 216 pairs between training, validation, and testing, the AR product recommendation system 102 utilizes the rank-SVM on the training data. The AR product recommendation system 102 utilizes the validation data to achieve optimal cost parameters required in the rank-SVM, and the AR product recommendation system 102 further utilizes the set data to report the accuracy of the rank-SVM.

As illustrated in FIG. 8, the AR product recommendation system 102 determines the weights $w_1$ and $w_2$ with corresponding costs and accuracies. For example, the AR product recommendation system 102 determines $w_1=0.21$ and $w_2=1.65$ with a corresponding cost of 3.5 and an accuracy of 73.19% over the validation set. Although not illustrated in FIG. 8, the AR product recommendation system 102 further determines an accuracy of 57.21% in the same scenario over the test set.

As mentioned, the AR product recommendation system 102 generates AR representations of recommended products to provide to the user client device 108. Indeed, FIGS. 9A-9D illustrate AR representations of recommended products 902-908 in accordance with the techniques and methods described herein. For example, the AR product recommendation system 102 utilizes the color compatibility algorithm described above to generate the AR products 902-908 to better match the color theme of the AR scene 900. Indeed, comparing FIGS. 7A-7D with FIGS. 9A-9D, the AR product recommendation system 102 not only more improves the product recommendations based on color compatibility, but also generates the final recommendations of FIGS. 9A-9D based on the overall score determination described above.

To illustrate, the AR product 904 differs from the AR product 704 not only in color but also in structure. Indeed, by implementing the overall score that is based on a weighted combination of both the style similarity as well as on the color compatibility, the AR product recommendation system 102 generates final recommended products 902-908 that may differ from those AR products 702-708 of FIG. 7. However, because the final recommended AR products 902-908 are matched with the AR scene 900 based on the overall scores, $\gamma_i$, the final recommended AR products 902-908 are more similar to the AR scene 900 than other recommended products.

In addition to generating final recommendations, the AR product recommendation system 102 can provide the final recommended AR products 902-908 to the user client device 108 via email, push notifications, an AR interface of the AR client application 110, or by some other means. Indeed, the AR product recommendation system 102 can provide more than one final recommended AR product (e.g., the top-ranked product).

The AR product recommendation system 102 can further enhance the AR scene 900 to distinguish the AR scene 900 from the viewpoint 300. Indeed, in some embodiments, the user client device 108 has a poor camera or otherwise captures a blurry camera feed—camera lenses often blur an image to some degree. Thus, the AR product recommendation system 102 utilizes contrasting, sharpening, and auto-cropping techniques to enhance the AR scene 900 to be clearer than a corresponding viewpoint 300 (e.g., to draw the user's focus). For example, the AR product recommendation system 102 can sharpen the AR scene 900 to emphasize texture and can further auto-crop the AR scene 900 to remove undesired or irrelevant background portions. Thus, the AR product recommendation system 102 can provide a visually appealing AR scene 900 to the user client device 108 (e.g., via AR client application 110).

Figure 10:
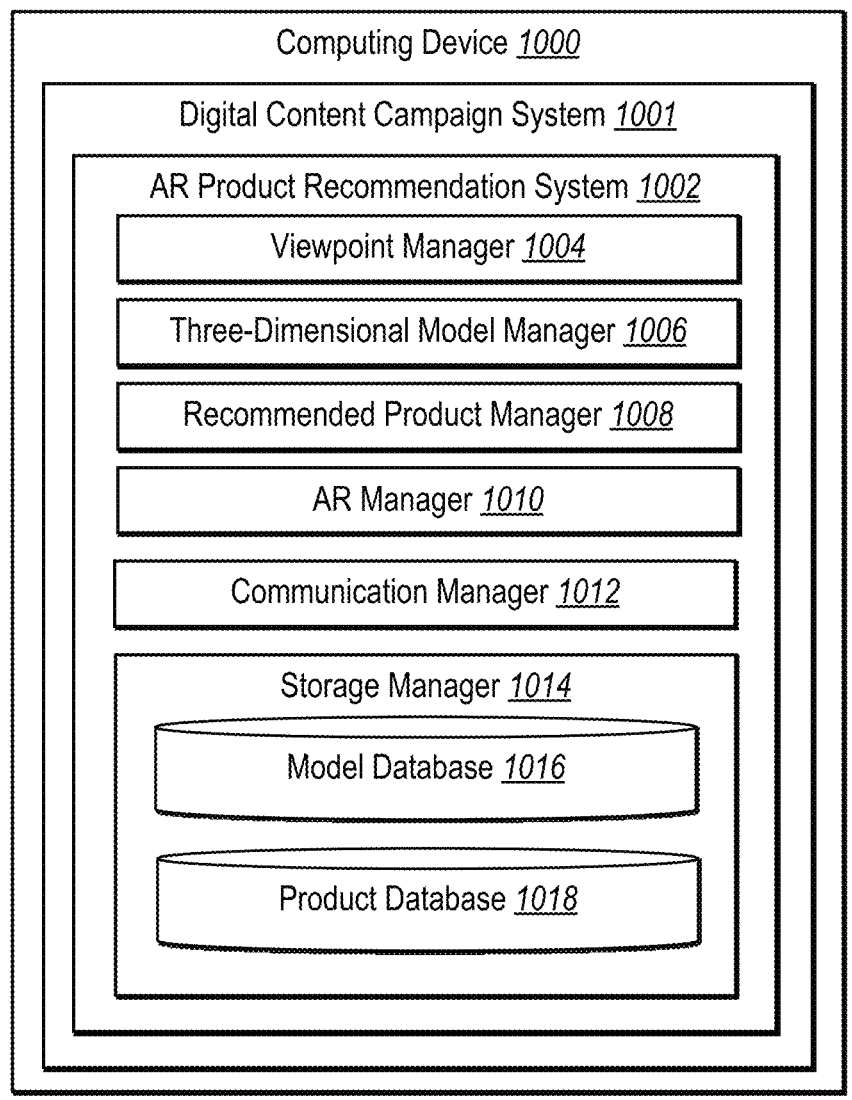
FIG. 10 illustrates a schematic diagram of an AR product recommendation system in accordance with one or more implementations.

Turning now to FIG. 10, additional detail will be provided regarding components and capabilities of the AR product recommendation system 1002 (e.g., the AR product recommendation system 102). Specifically, FIG. 10 illustrates an example schematic diagram of the AR product recommendation system 1002 on an example computing device 1000 (e.g., one or more of the user client device 108 and/or server(s) 104). As shown in FIG. 10, the AR product recommendation system 1002 may include a viewpoint manager 1004, a three-dimensional model manager 1006, a recommended product manager 1008, an AR manager 1010, a communication manager 1012, and a storage manager 1014.

As mentioned, the AR product recommendation system 1002 can include a viewpoint manager 1004. In particular, the viewpoint manager 1004 can receive and analyze a camera feed to detect, identify, generate, or otherwise determine a viewpoint associated with the camera feed. Indeed, as described above, the viewpoint manager 1004 can access accelerometer data or other motion-related data associated with a user client device to determine a time instant where the user client device is sufficiently still to capture a frame of the camera feed. In addition, the viewpoint manager 1004 can analyze the viewpoint to identify, locate, detect, or determine real-world objects within a viewpoint.

As shown, the AR product recommendation system 1002 further includes a three-dimensional model manager 1006. The three-dimensional model manager 1006 can communicate with the viewpoint manager 1004 to search for, identify, determine, or generate a three-dimensional model that matches an identified real-world object. For example, the three-dimensional model manager 1006 can communicate with the storage manager 1014 to access the model database 1016 (e.g., the model database 112) to search for and identify a three-dimensional model from within the model database 1016. Indeed, as described above, the three-dimensional model manager 1006 can utilize a 2D-3D alignment algorithm to identify a three-dimensional model that matches an object identified within the viewpoint.

As further shown, the AR product recommendation system 1002 includes a recommended product manager 1008. In particular, the recommended product manager 1008 can search for, locate, identify, determine, produce, or generate recommended products based on a given three-dimensional model. For example, the recommended product manager 1008 can communicate with the storage manager 1014 to access the product database 1018 to identify one or more products that are similar to a given three-dimensional model. As described herein, the recommended product manager 1008 can utilize a style similarity algorithm to generate recommended products that match a style of a particular three-dimensional model.

In addition, the recommended product manager 1008 can utilize, implement, or employ a color compatibility algorithm to determine a color theme of a real-world environment depicted within a viewpoint and to generate recommended products that are compatible with the color theme. For example, the recommended product manager 1008 can determine a color compatibility score for a plurality of products within the product database 1018. Indeed, the recommended product manager 1008 can identify products that have colors that fit the color scheme or else can adjust the colors of recommended products to better match the color scheme.

Furthermore, the recommended product manager 1008 can determine an overall score for a plurality of products within the product database 1018. Indeed, the recommended product manager 1008 can determine the overall score, as described above, by determining a weighted linear combination of the style similarity score and the color compatibility score. Thus, based on the overall score, the recommended product manager 1008 can generate final recommended products by ranking products within the product database 1018 according to their respective overall scores.

Additionally, the AR product recommendation system 1002 includes an AR manager 1010. In particular, the AR manager 1010 can render, produce, or otherwise generate AR representations of recommended products. For instance, the AR manager 1010 can generate AR representations of final recommended products. The AR manager 1010 can further generate an AR scene that includes a depiction of an AR product in place of a previously-identified real-world object, where the AR product is stylistically similar and color compatible with the real-world environment of the scene. As described above, the AR manager 1010 can further enhance the AR scene by implementing contrasting, sharpening, and/or auto-cropping techniques.

As further illustrated in FIG. 10, the AR product recommendation system 1002 includes a communication manager 1012. In particular, the communication manager 1012 can communicate or interface with a user client device to transmit and/or receive data such as a camera feed, a viewpoint, an AR scene, an email, a push notification, etc. Indeed, the communication manager 1012 can facilitate providing an AR scene to a user client device whereby a user can experience a recommended product rendered to appear within a real-world environment displayed by way of the user client device.

In one or more embodiments, each of the components of the AR product recommendation system 1002 are in communication with one another using any suitable communication technologies. Additionally, the components of the AR product recommendation system 1002 can be in communication with one or more other devices including one or more user client devices described above. It will be recognized that although the components of the AR product recommendation system 1002 are shown to be separate in FIG. 10, any of the subcomponents may be combined into fewer components, such as into a single component, or divided into more components as may serve a particular implementation. Furthermore, although the components of FIG. 10 are described in connection with the AR product recommendation system 1002, at least some of the components for performing operations in conjunction with the AR product recommendation system 1002 described herein may be implemented on other devices within the environment.

The components of the AR product recommendation system 1002 can include software, hardware, or both. For example, the components of the AR product recommendation system 1002 can include one or more instructions stored on a computer-readable storage medium and executable by processors of one or more computing devices (e.g., the computing device 1000 or the computing device 1300 of FIG. 13). When executed by the one or more processors, the computer-executable instructions of the AR product recommendation system 1002 can cause the computing device 1300 to perform the methods described herein. Alternatively, the components of the AR product recommendation system 1002 can comprise hardware, such as a special purpose processing device to perform a certain function or group of functions. Additionally, or alternatively, the components of the AR product recommendation system 1002 can include a combination of computer-executable instructions and hardware.

Furthermore, the components of the AR product recommendation system 1002 performing the functions described herein may, for example, be implemented as part of a stand-alone application, as a module of an application, as a plug-in for applications including content management applications, as a library function or functions that may be called by other applications, and/or as a cloud-computing model. Thus, the components of the AR product recommendation system 1002 may be implemented as part of a stand-alone application on a personal computing device or a mobile device. Alternatively, or additionally, the components of the AR product recommendation system 1002 may be implemented in any application that allows creation and delivery of marketing content to users, including, but not limited to, applications in ADOBE CREATIVE CLOUD and/or ADOBE MARKETING CLOUD, such as ADOBE CAMPAIGN, ADOBE ANALYTICS, and ADOBE MEDIA OPTIMIZER. "ADOBE," "CREATIVE CLOUD," "MARKETING CLOUD," "CAMPAIGN," "ANALYTICS," and "MEDIA OPTIMIZER," are registered trademarks of Adobe Systems Incorporated in the United States and/or other countries.

FIGS. 1-10, the corresponding text, and the examples provide a number of different systems, methods, and non-transitory computer readable media for generating and providing AR representations of recommended products based on style similarity with real-world surroundings. In addition to the foregoing, embodiments can also be described in terms of flowcharts comprising acts for accomplishing a particular result. For example, FIG. 11 illustrates a flowchart of an example sequence of acts in accordance with one or more embodiments.

Figure 11:
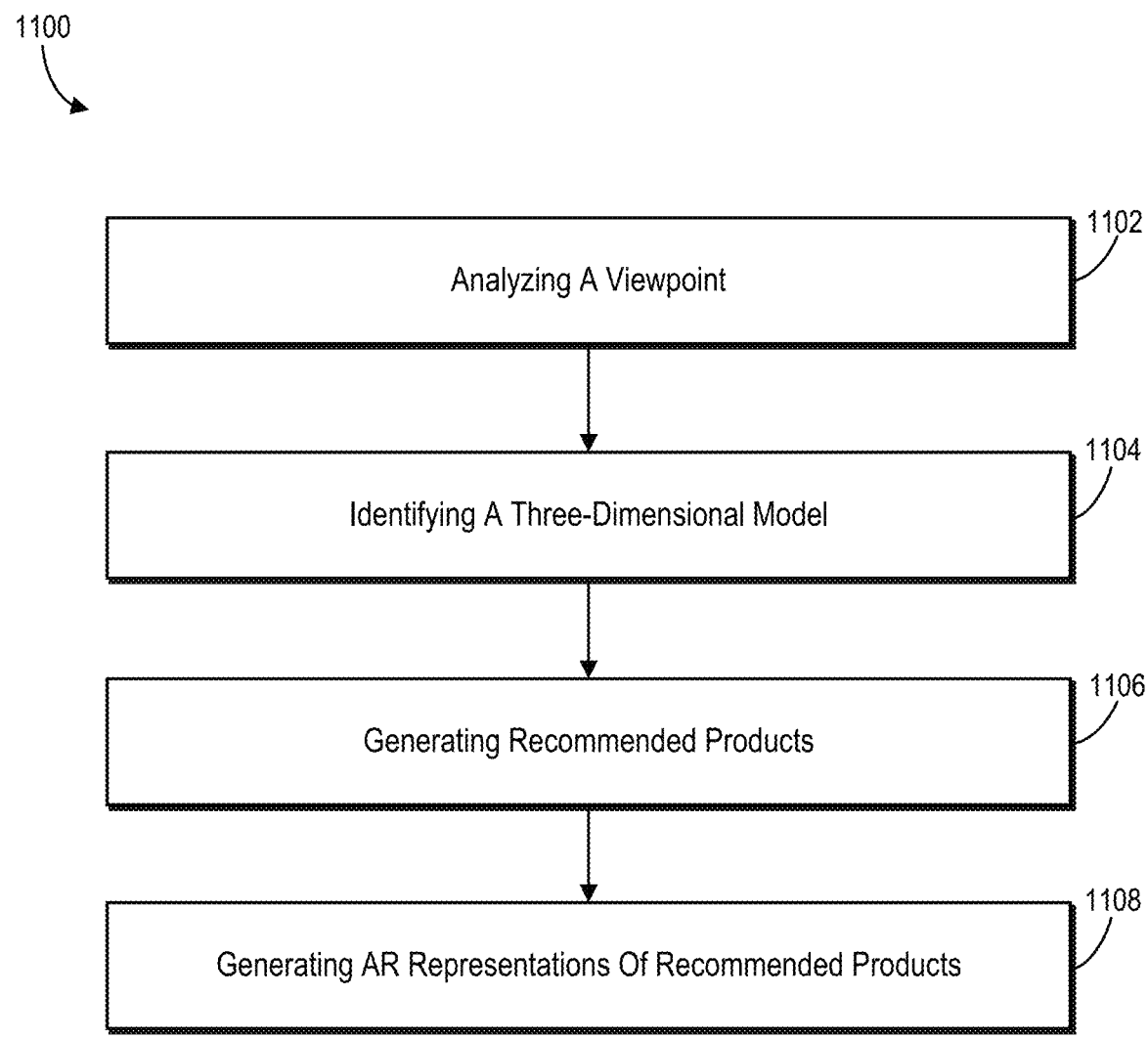
FIG. 11 illustrates a flowchart of a series of acts for generating AR representations of recommended products in accordance with one or more implementations.

While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 of generating and providing an AR representation of a recommended product based on style similarity with real-world surroundings. In particular, the series of acts 1100 can include an act 1102 of analyzing a viewpoint. For example, the act 1102 can involve analyzing a real-world environment depicted within a viewpoint of a camera feed received from the user client device to identify one or more real-world objects. The act 1102 can further involve utilizing a neural network to generate proposed regions of the viewpoint with corresponding probabilities of containing real-world objects. In addition, the series of acts 1100 can include an act of determining, in relation to the real-world environment, a location and an orientation of the real-world object.

As shown, the series of acts 1100 further includes an act 1104 of identifying a three-dimensional model. In particular, the act 1104 can involve identifying, for each of the identified one or more real-world objects, a matching three-dimensional model from a model database. The act 1104 can further involve implementing a 2D-3D alignment algorithm to determine, for each of a plurality of three-dimensional models with the model database, an alignment relative to the real-world object.

As further shown, the series of acts 1100 includes an act 1106 of generating recommended products. In particular, the act 1106 can involve utilizing the style similarity algorithm to determine similarity scores for a plurality of products within a product database, wherein the similarity scores are based on comparing geometric features of the three-dimensional model with geometric features of the plurality of products. The act 1106 can further involve generating, utilizing a style similarity algorithm for an identified matching three-dimensional model, one or more recommended products based on style similarity in relation to the identified matching three-dimensional model.

Additionally, the series of acts 1100 includes an act 1108 of generating AR representations of recommended products. In particular, the act 1108 can involve generating an augmented reality representation of the one or more recommended products to overlay in place of a real-world object of the one or more real-world objects. For example, the act 1108 can include utilizing a color compatibility algorithm to, based on identifying colors within the viewpoint, determine one or more colors for the augmented reality representation of the one or more recommended products.

Although not illustrated in FIG. 11, the series of acts 1100 can further include an act of removing real-world objects. The series of acts 1100 can also include an act of receiving an indication from the user client device to replace a real-world object of the one or more real-world objects depicted within the viewpoint. The indication can include a user input to elect to replace the real-world object within the viewpoint. The series of acts 1100 can also include an act of generating a final product recommendation. Indeed, the act of generating a final product recommendation can involve acts of determining overall scores for the one or more recommended products based on weighted linear combinations of style similarity and color compatibility and selecting a recommended product of the one or more recommended products based on the overall scores.

The series of acts 1100 can further include an act of providing the augmented reality representation of the one or more recommended products by positioning, within the real-world environment of the camera feed, the augmented reality representation of the one or more recommended products to match the location and the orientation of the real-world object. In addition, the series of acts 1100 can include an act of determining the viewpoint. The act of determining the viewpoint can include selecting a time instant during an application session associated with the user client device where the user client device satisfies a stillness threshold and capturing a frame of the camera feed at the time instant.

Figure 12:
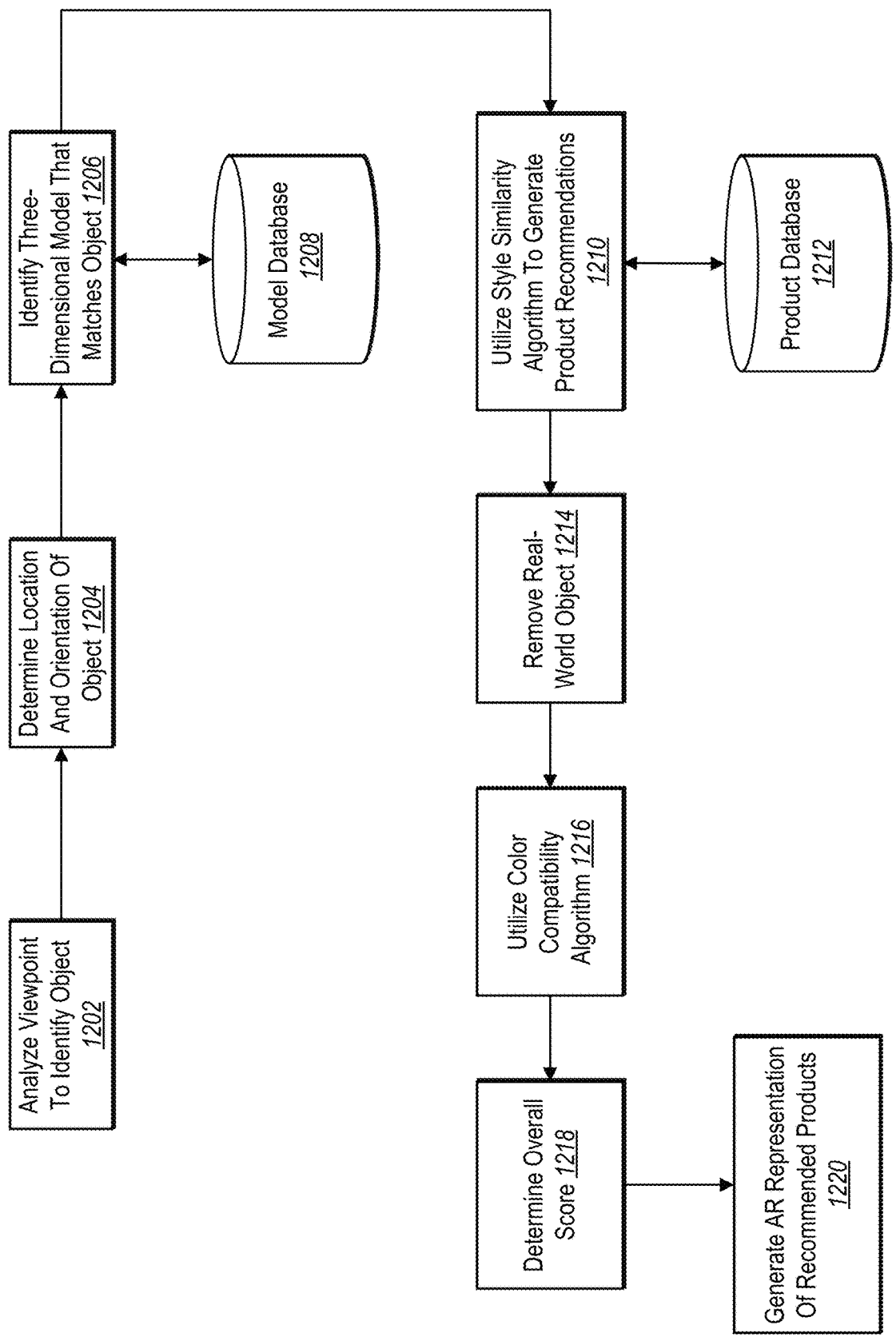
FIG. 12 illustrates a series of acts in a step for generating an augmented reality representation of a recommended product based on three-dimensional models that match a style of real-world objects depicted within the viewpoint in accordance with one or more implementations.

As mentioned, the AR product recommendation system 102 generates an AR representation of a recommended product based on style similarity in relation to real-world surroundings. Indeed, FIG. 12 illustrates structure for performing a step for generating an augmented reality representation of a recommended product based on three-dimensional models that match a style of real-world objects depicted within the viewpoint.

As illustrated, the step for generating the AR representation can include acts 1202-1216. In particular, the AR product recommendation system 102 can perform act 1202 to analyze a viewpoint. Indeed, as described above, the AR product recommendation system 102 can generate a viewpoint from a camera feed received from a user client device.

To generate the viewpoint, the AR product recommendation system 102 can capture a frame of the camera feed at a time instant where the user client device satisfies a stillness threshold. In addition, the AR product recommendation system 102 performs act 1202 to analyze the viewpoint to identify or detect real-world objects within the real-world environment depicted by the viewpoint. To analyze the viewpoint, the AR product recommendation system 102 can implement the techniques and methods described above in relation to FIG. 4.

As further illustrated, the AR product recommendation system 102 can perform act 1204 to determine a location and an orientation of identified real-world objects. To elaborate, the AR product recommendation system 102 can utilize any of the techniques described above to determine a location and orientation in world space of one or more real-world objects identified within the viewpoint.

In addition, the AR product recommendation system 102 can perform act 1206 to identify a three-dimensional model. As shown, and as described above, the AR product recommendation system 102 can access the model database 1208 (e.g., the model database 112) and can further implement a 2D-3D alignment algorithm to identify one or more three-dimensional models that match real-world objects identified within the viewpoint.

The AR product recommendation system 102 can still further perform act 1210 to utilize a style similarity algorithm to generate product recommendations. In particular, the AR product recommendation system 102 can access a product database 1212 (e.g., the product database 114) to identify products that are stylistically similar to a particular three-dimensional model (and, by association, a corresponding real-world object).

As shown in FIG. 12, the AR product recommendation system 102 can further perform act 1214 to remove real-world objects. In particular, the AR product recommendation system 102 can remove a real-world object that is to be replaced with an AR representation of a recommended product. Indeed, the AR product recommendation system 102 can implement image modification techniques described above to remove a real-world object and replace the removed object with a recommended product.

Additionally, the AR product recommendation system 102 can perform act 1216 to utilize a color compatibility algorithm, as set forth above. In particular, the AR product recommendation system 102 can utilize a color compatibility algorithm in relation to an embedded stylistically similar recommended product to generate an AR representation of the recommended product that is color compatible with the environment. Indeed, the AR product recommendation system 102 can utilize the color compatibility algorithm to determine a color compatibility score in addition to determining a style similarity score utilizing the style similarity algorithm.

As further illustrated, the AR product recommendation system 102 can perform act 1218 to determine an overall score. For instance, the AR product recommendation system 102 can determine a linear combination (or some other combination) of the style similarity score and the color compatibility score to determine an overall score for a recommended product. Based on determining the overall scores, the AR product recommendation system 102 can further identify those recommended products that satisfy a threshold overall score.

Additionally, the AR product recommendation system 102 can perform act 1220 to generate AR representations of recommended products. In particular, the AR product recommendation system 102 can generate AR representations to overlay within the real-world environment of the viewpoint. The AR product recommendation system 102 can generate AR representations of recommended products for those products that have a highest overall score. Thus, the AR product recommendation system 102 can generate an AR scene that includes AR representations of recommended products overlaid within a real-world environment whereby a user can view the products as though they are placed in the user's real-world surroundings.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
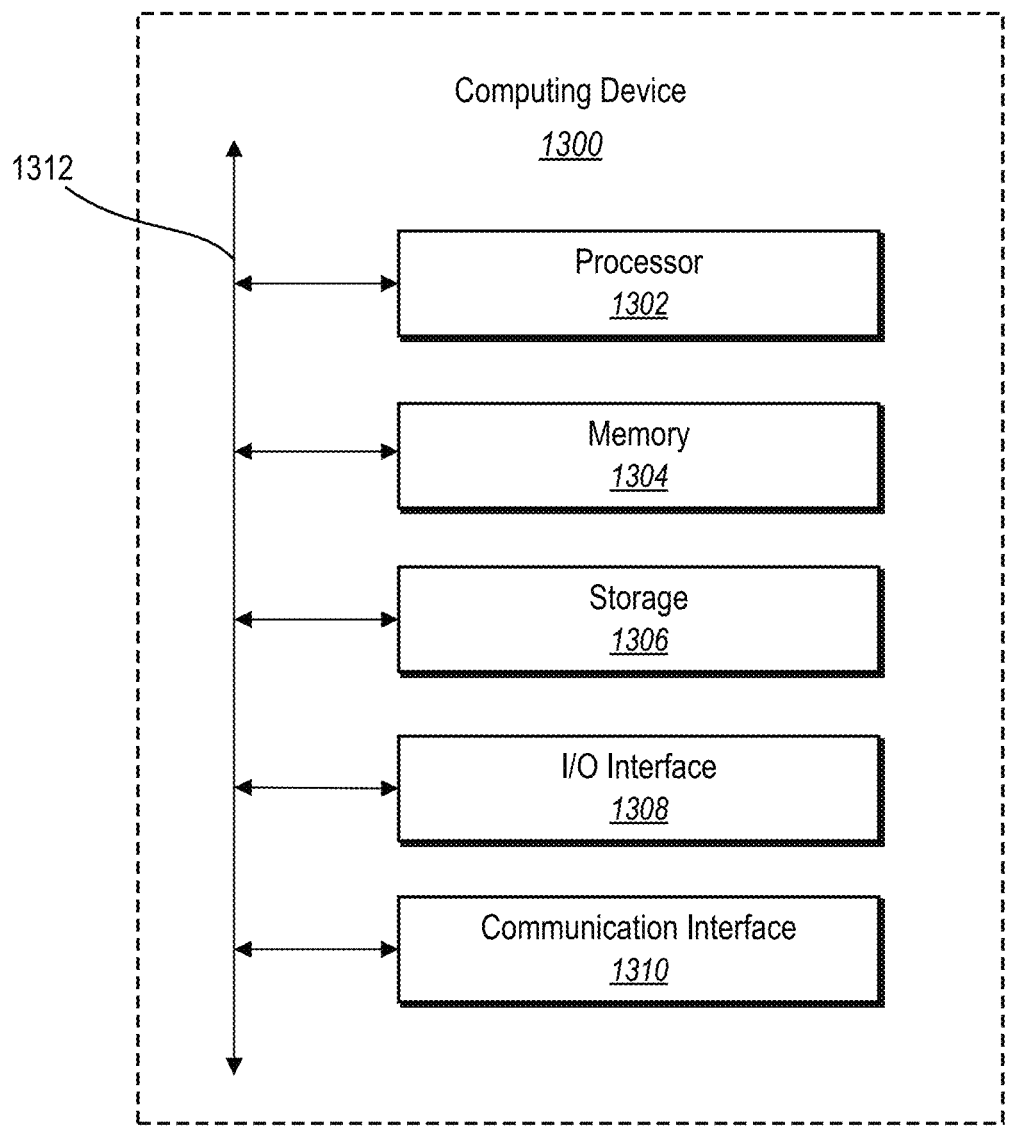
FIG. 13 illustrates a block diagram of an example computing device in accordance with one or more implementations.

FIG. 13 illustrates, in block diagram form, an example computing device 1300 (e.g., computing device 1000, user client device 108, and/or server(s) 104) that may be configured to perform one or more of the processes described above. One will appreciate that the AR product recommendation system 102 can comprise implementations of the computing device 1300. As shown by FIG. 13, the computing device can comprise a processor 1302, memory 1304, a storage device 1306, an I/O interface 1308, and a communication interface 1310. Furthermore, the computing device 1300 can include an input device such as a touchscreen, mouse, keyboard, etc. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a writing device or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for providing context-aware product recommendations, a computer-implemented method for generating a three-dimensional digital representation of a product based on a similarity to real-world surroundings of a user, comprising:
   determining, based on a camera feed received from a user client device, a viewpoint that depicts a real-world environment associated with the user client device;
   performing a step for generating an augmented reality representation of a recommended product based on three-dimensional models that match a style of real-world objects depicted within the viewpoint; and
   providing the augmented reality representation for display on the user client device.

2. The computer-implemented method of claim 1, wherein determining the viewpoint comprises:
   selecting a time instant during an application session associated with the user client device where the user client device satisfies a stillness threshold; and
   capturing a frame of the camera feed at the time instant.

3. The computer-implemented method of claim 2, further comprising determining that the user client device satisfies the stillness threshold by accessing accelerometer information associated with the user client device.

4. The computer-implemented method of claim 1, wherein providing the augmented reality representation for display on the user client device comprises providing an augmented reality scene in which a real-world object has been replaced by the augmented reality representation of a recommended product.

5. A non-transitory computer readable medium for generating a three-dimensional digital representation of a product based on a similarity to real-world surroundings of a user, the non-transitory computer readable medium comprising instructions that, when executed by at least one processor, cause a user client device to:
- analyze a real-world environment depicted within a viewpoint of a camera feed received from the user client device to identify one or more real-world objects within the real-world environment;
- identify, from a model database, a matching three-dimensional model that matches an identified real-world object of the one or more real-world objects within the real-world environment;
- generate, utilizing a style similarity algorithm to compare geometric features of the three-dimensional model with geometric features of products from a product database, one or more recommended products based on style similarity in relation to the matching three-dimensional model that matches the identified real-world object; and
- generate an augmented reality representation of the one or more recommended products to overlay in place of a real-world object of the one or more real-world objects within the real-world environment.

6. The non-transitory computer readable medium of claim 5, further comprising instructions that, when executed by the at least one processor, cause the user client device to generate a final product recommendation by:
- determining overall scores for the one or more recommended products based on weighted linear combinations of style similarity and color compatibility; and
- selecting a recommended product of the one or more recommended products based on the overall scores.

7. The non-transitory computer readable medium of claim 5, further comprising instructions that, when executed by the at least one processor, cause the user client device to determine, in relation to the real-world environment, a location and an orientation of the real-world object.

8. The non-transitory computer readable medium of claim 7, further comprising instructions that, when executed by the at least one processor, cause the user client device to provide the augmented reality representation of the one or more recommended products by positioning, within the real-world environment of the camera feed, the augmented reality representation of the one or more recommended products to match the location and the orientation of the real-world object.

9. The non-transitory computer readable medium of claim 7, wherein the instructions cause the user client device to generate the augmented reality representation of the one or more recommended products by utilizing a color compatibility algorithm to, based on identifying colors within the viewpoint, determine one or more colors for the augmented reality representation of the one or more recommended products.

10. The non-transitory computer readable medium of claim 5, further comprising instructions that, when executed by the at least one processor, cause the user client device to determine the viewpoint by:
- selecting a time instant during an application session associated with the user client device where the user client device satisfies a stillness threshold; and
- capturing a frame of the camera feed at the time instant.

11. The non-transitory computer readable medium of claim 5, wherein the instructions cause the user client device to analyze the viewpoint to identify the real-world object by utilizing a neural network to generate proposed regions of the viewpoint with corresponding probabilities of containing real-world objects.

12. The non-transitory computer readable medium of claim 5, wherein the instructions cause the user client device to generate the one or more recommended products by utilizing the style similarity algorithm to determine similarity scores for a plurality of products within a product database, wherein the similarity scores are based on comparing geometric features of the three-dimensional model with geometric features of the plurality of products.

13. The non-transitory computer readable medium of claim 5, wherein the instructions cause the user client device to identify the matching three-dimensional model by implementing a 2D-3D alignment algorithm to determine, for each of a plurality of three-dimensional models with the model database, an alignment relative to the real-world object.

14. A system for generating a three-dimensional digital representation of a product based on a similarity to real-world surroundings of a user, the system comprising:
- at least one processor; and
- a non-transitory computer readable medium comprising:
  - a model database; and
  - instructions that, when executed by the at least one processor, cause the system to:
    - analyze a real-world environment depicted within a viewpoint of a camera feed received from a user client device to identify one or more real-world objects within the real-world environment by utilizing a neural network to determine proposed regions within the viewpoint that each satisfy a probability of containing a real-world object;
    - identify, from a model database, a matching three-dimensional model that matches an identified real-world object of the one or more real-world objects within the real-world environment;
    - generate, utilizing a style similarity algorithm to compare geometric features of the three-dimensional model with geometric features of products from a product database, one or more recommended products based on style similarity in relation to the matching three-dimensional model that matches the identified real-world object; and
    - in response to receiving an indication from the user client device to replace a real-world object of the one or more real-world objects depicted within the viewpoint, generate an augmented reality representation of the one or more recommended products to overlay in place of the real-world object.

15. The system of claim 14, further comprising instructions that, when executed by the at least one processor, cause the system to generate a final product recommendation by:
- determining overall scores for the one or more recommended products based on weighted linear combinations of style similarity and color compatibility; and
- selecting a recommended product of the one or more recommended products based on the overall scores.

16. The system of claim 14, further comprising instructions that, when executed by the at least one processor, cause the system to:
- generate, utilizing a region proposal network, object bounds that satisfy a probability of containing real-world objects within the real-world environment; and
- determine, utilizing a fast region-based convolutional neural network that shares convolutional features with the region proposal network, object classes for the one or more real-world objects depicted within the object bounds within the real-world environment.

17. The system of claim 16, further comprising instructions that, when executed by the at least one processor, cause the system to provide the augmented reality representation of the one or more recommended products by positioning, within the real-world environment of the camera feed, the augmented reality representation of the one or more recommended products to match a location and an orientation of the real-world object.

18. The system of claim 17, wherein the instructions cause the system to generate the augmented reality representation of the one or more recommended products by utilizing a color compatibility algorithm to, based on identifying colors within the viewpoint, determine one or more colors for the augmented reality representation of the one or more recommended products.

19. The system of claim 14, further comprising instructions that, when executed by the at least one processor, cause the system to determine the viewpoint by:
   selecting a time instant during an application session associated with the user client device where the user client device satisfies a stillness threshold; and
   capturing a frame of the camera feed at the time instant.

20. The system of claim 14, wherein the indication to replace the real-world object comprises a user input to elect to replace the real-world object within the viewpoint.

* * * * *